United States Patent [19]
Goddard et al.

[11] Patent Number: 5,796,974
[45] Date of Patent: Aug. 18, 1998

[54] MICROCODE PATCHING APPARATUS AND METHOD

[75] Inventors: Michael D. Goddard; David S. Christie, both of Austin, Tex.

[73] Assignee: Advanced Micro Devices, Inc., Sunnyvale, Calif.

[21] Appl. No.: 553,204

[22] Filed: Nov. 7, 1995

[51] Int. Cl.$^6$ ............................................. G06F 9/30
[52] U.S. Cl. ..................... 395/387; 395/385; 395/568
[58] Field of Search ............................. 395/384, 385, 395/387, 388, 568, 567, 183.11, 800.23, 570, 571

[56] References Cited

U.S. PATENT DOCUMENTS

| | | | |
|---|---|---|---|
| 3,781,808 | 12/1973 | Ahearn et al. | 395/417 |
| 3,911,406 | 10/1975 | McLaughlin et al. | 395/429 |
| 4,044,338 | 8/1977 | Wolf | 365/49 |
| 4,161,784 | 7/1979 | Cushing et al. | 364/748 |
| 4,179,737 | 12/1979 | Kim | 395/588 |
| 4,453,212 | 6/1984 | Gaither et al. | 395/402 |
| 4,502,111 | 2/1985 | Riffe et al. | 395/380 |
| 4,736,288 | 4/1988 | Shintani et al. | 395/393 |
| 4,807,115 | 2/1989 | Torng | 395/391 |
| 4,858,105 | 8/1989 | Kuriyama et al. | 395/582 |
| 4,926,322 | 5/1990 | Stimac et al. | 395/500 |
| 4,928,223 | 5/1990 | Dao et al. | 395/597 |
| 4,982,360 | 1/1991 | Johnson et al. | 395/435 |
| 4,992,934 | 2/1991 | Portanova et al. | 395/385 |
| 5,056,006 | 10/1991 | Acharya et al. | 395/474 |
| 5,128,888 | 7/1992 | Tamura et al. | 364/748 |
| 5,129,067 | 7/1992 | Johnson | 395/389 |
| 5,131,086 | 7/1992 | Circello et al. | 395/389 |
| 5,136,697 | 8/1992 | Johnson | 395/586 |
| 5,155,816 | 10/1992 | Kohn | 395/381 |
| 5,155,820 | 10/1992 | Gibson | 395/386 |
| 5,185,868 | 2/1993 | Tran | 395/393 |
| 5,212,693 | 5/1993 | Chao et al. | 395/182.03 |
| 5,222,230 | 6/1993 | Gill et al. | 395/800 |
| 5,222,244 | 6/1993 | Carbine et al. | 395/800.41 |
| 5,226,126 | 7/1993 | McFarland et al. | 395/394 |
| 5,226,130 | 7/1993 | Favor et al. | 395/585 |
| 5,233,694 | 8/1993 | Hotta et al. | 395/391 |
| 5,233,696 | 8/1993 | Suzuki | 395/380 |
| 5,251,306 | 10/1993 | Tran | 395/393 |
| 5,423,013 | 6/1995 | Baum et al. | 395/490 |
| 5,465,373 | 11/1995 | Kahle et al. | 395/391 |
| 5,623,665 | 4/1997 | Shimada et al. | 395/182.03 |

FOREIGN PATENT DOCUMENTS

| | | |
|---|---|---|
| 0 092 646 A1 | 2/1983 | European Pat. Off. |
| A-0 092 646 | 2/1983 | European Pat. Off. |
| 0259095 | 3/1988 | European Pat. Off. |
| 0381471 | 8/1990 | European Pat. Off. |
| 0454984 | 11/1991 | European Pat. Off. |

(List continued on next page.)

OTHER PUBLICATIONS

Shreekant S. Thakkar and William E. Hostmann, "An Instruction Fetch Unit for a Graph Reduction Machine", The 13th Annual International Symposium on Computer Architecture, Jun. 2–5 1986, pp. 82–91.

(List continued on next page.)

*Primary Examiner*—Parshotam S. Lall
*Assistant Examiner*—Viet Vu
*Attorney, Agent, or Firm*—Skjerven, Morrill, MacPherson, Franklin & Friel LLP; Ken J. Koestner

[57] ABSTRACT

A microcode patching method and apparatus provides for fetching of microcode from an external source which, under appropriate conditions, replaces direct reading of microcode from a microcode ROM. In a decoder having a capability to concurrently dispatch up to four instructions and each dispatch pathway having two alternative decoding pathways including a fastpath pathway and a microcode ROM pathway, a technique and apparatus for patching the microcode ROM is described. This technique and apparatus provides that execution codes from the microcode ROM are selectively replaced, during decoding, by codes taken from an external source, such as from an external memory via a byte queue.

31 Claims, 11 Drawing Sheets

FOREIGN PATENT DOCUMENTS

| | | |
|---|---|---|
| 0454985 | 11/1991 | European Pat. Off. |
| 0459232 | 12/1991 | European Pat. Off. |
| 0506972 | 10/1992 | European Pat. Off. |
| 0380854 | 1/1993 | European Pat. Off. |
| 0498654 | 1/1994 | European Pat. Off. |
| 0 651 320 A1 | 9/1994 | European Pat. Off. |
| 0 651 324 A1 | 9/1994 | European Pat. Off. |
| 58002946 | 6/1981 | Japan |
| A-58-002 946 | 8/1983 | Japan |
| 2 263 985 | 8/1993 | United Kingdom |
| 2 263 987 | 8/1993 | United Kingdom |
| WO 92/08231 | 5/1992 | WIPO |
| 93/01546 | 1/1993 | WIPO |
| 93/20507 | 10/1993 | WIPO |

OTHER PUBLICATIONS

F. A. Scherpenberg and Douglas Sheppard, Asynchronous Circuits Accelerate Access to 256–K Read–Only Memory, Jun. 2, 1982, pp. 141–145, Electronics International No. 11, New York, NY.

Michael Slater, "AMD's K5 Designed to Outrun Pentium", Microprocessor Report, Oct. 24, 1994, pp. 1, 6–11.

Toyohiko Yoshida, "The Approach to Multiple Instruction Execution in the GMICRO/400 Processor", 1991, pp. 185–195.

Mike Johnson, "Superscalar Microprocessor Design", Prentice Hall series in innovative technology, 1991.

Mike Johnson, "A Superscaler 386", Superscalar Microprocessor Design, Prentice Hall Series in innovative technology, 1991, pp. 261–272.

"System/370 Emulator Assist Processor for a Reduced Instruction Set Computer", IBM Technical Disclosure Bulletin, vol. 30, No. 10, Mar. 1988, pp. 308–309.

5,796,974

1
MICROCODE PATCHING APPARATUS AND METHOD

FIELD OF INVENTION

This invention relates to the field of instruction decoders in a processor. More specifically, this invention relates to an instruction decoder that includes circuits for patching a permanent memory on a processor chip using information from an external memory.

BACKGROUND OF THE INVENTION

Computers and processors often implement various instructions and operating procedures in a permanent, hard-coded memory such as a microcode ROM. It is advantageous to provide supplemental or modified functional capabilities to the microcode ROM operations. For example, various infrequently-used operations, such as test functions, are purposely omitted from the hard-coded microcode ROM memory to save ROM capacity. Similarly, experimental functions that are likely to be modified after testing are not generally hard-coded into the microcode ROM memory. Furthermore, occasional coding errors are discovered in the permanent ROM memories. If infrequently-used operations, experimental functions, errors and the like are hard-coded into microcode ROM memory, subsequent modification of the microcode ROM program is expensive in cost and delay while awaiting fabrication of new integrated circuits.

For example, many of the complex operations in an implementation of an x86 architecture are controlled by microcode sequences which are stored in processor integrated circuit memory. Due to the complex instruction set and large number of signal combinations which can be applied to the processor, complete and exhaustive testing of such an integrated circuit is not possible using pre-silicon logic simulation. Thus, there is a high probability that errors in the microcode are not found until silicon is fabricated and exercised in a system. The microcode is typically stored in permanent read only memory ROM rather than in volatile random access memory RAM because of the much higher circuit density of ROM. Therefore, correction of errors requires creation of new silicon integrated circuit chips. Creation of new silicon is relatively expensive and wasteful of product development time. If the nature of the error blocks further testing of the integrated circuit chip, silicon verification time is seriously impacted, delaying entry of the integrated circuit into production.

What is needed is a less expensive and faster technique for furnishing enhanced capabilities and experimental functions and for fixing errors found in the integrated circuit. One such technique involves a system which substitutes a correct microcode sequence for an incorrect sequence. One solution includes implementation of a small part of the microcode memory as a writable RAM in which one or more small sequences ("patches") are stored. This solution utilizes some means for denoting which sequences in ROM are to be replaced by sequences held in substitution RAM. In implementing this technique, a tradeoff is made between limiting the size of RAM to a reasonable capacity and achieving a suitable and useful number of patches for operability of the silicon at one time. By accommodating a larger number of patches, the likelihood is increased of achieving a suitable amount of system verification before the silicon must be recreated.

What is needed is a technique for patching permanent memory that consumes only a small amount of integrated circuit area while achieving a large number of patches.

2
SUMMARY OF THE INVENTION

In accordance with the present invention, a microcode patching method and apparatus provides for fetching of microcode from an external source which, under appropriate conditions, replaces direct reading of microcode from a microcode ROM.

In accordance with one embodiment of the present invention, a decoder having a capability to concurrently dispatch up to four instructions and each dispatch pathway having two alternative decoding pathways including a fast-path pathway and a microcode ROM pathway, a technique and apparatus for patching the microcode ROM is described. This technique and apparatus provides that execution codes from the microcode ROM are selectively replaced, during decoding, by codes taken from an external source, such as from an external memory via a byte queue.

In accordance with another embodiment of the invention, an apparatus for supplying decoded operational information includes an external memory which stores codes including instructions and decoded operational information and a permanent memory including a plurality of operational information elements. A circuit connected to the external memory and connected to the permanent memory converts an instruction to a pointer into the permanent memory. A programmable memory is connected to the converting circuit and includes a plurality of selection elements corresponding to the plurality of operational information elements. A circuit connected to the external memory, permanent memory and programmable memory supplies either operational information designated by the pointer from the permanent memory or decoded operational information from the external memory. This selection is controlled by a selection element designated by the pointer. The apparatus also includes a programmable base address register which designates an address in external memory for accessing decoded operational information. The address programmed in the programmable base address register is concatenated with the pointer to designate the address in external memory for accessing decoded operational information.

A breakpoint enable register is connected to the programmable memory in which the programmable memory is a breakpoint random access memory (RAM) array including a single RAM bit for each operational information element in the permanent memory. The breakpoint enable register is loaded into the breakpoint RAM array and the single RAM bit is programmed to a 0 or 1 to control whether operational information designated by the pointer from the permanent memory or decoded operational information from the external memory is selected.

The apparatus also includes conditional latches for latching parameters indicative of a state of the instructions prior to commencing selection of decoded operational information from the external memory.

In accordance with another embodiment of the invention, an apparatus for decoding complex instruction set computer (CISC) instructions into RISC-like operations (ROPs) operable on a reduced instruction set computer (RISC) superscalar core includes a plurality of dispatch positions for converting a sequence of at least one CISC instructions read from an external memory into a plurality of ROPs. Each CISC instruction maps to a sequence of one or more ROPs. The apparatus also includes an ROP multiplexer for allocating the dispatch positions to the CISC instruction sequence in program order and for directing each CISC instruction of the CISC instruction sequence to at least one of the dispatch positions and an instruction conversion circuit in each of the dispatch positions for converting a first-type CISC instruction to ROP information. A permanent memory is included in each of the dispatch positions for converting a second-type CISC instruction to ROP information. An ROP selector is included to select ROP information from the instruction conversion circuit for ROPs mapped from first-type CISC instructions and to select ROP information from the permanent memory for ROPs mapped from second-type CISC instructions, and for dispatching ROPs in a current dispatch window to the superscalar RISC core. The apparatus also includes a programmable memory corresponding to the second-type CISC instruction and a demultiplexer connected to the ROP multiplexer to receive ROP information from the external memory, connected to the permanent memory to receive ROP information converted from a second-type CISC instruction and coupled to the programmable memory, the demultiplexer selecting ROP information from the external memory or the permanent memory in accordance with the programmable memory.

One advantage of the disclosed method and apparatus for patching microcode ROM is that a substantial amount of microcode patching is possible, encompassing nearly the entire microcode ROM capacity if necessary, at a cost of very little additional patching circuitry. Additional patching circuitry includes a mere single bit of RAM for each microcode ROM entry, a multiplexer and a latch. Other components of the patching function, such as a capability to operate in an 8-byte mode, a capability of operating in a noncacheable mode, and an instruction scanning circuit are already furnished in the instruction decoder.

Another advantage of the disclosed patching method and apparatus is that a substantial addition of RAM, which is expensive in both cost and circuit area utilization, is avoided. A further advantage of the disclosed method and apparatus is that the patching circuit allows flexible implementation of microcode which is under development in a real computer system which operates under actual time constraints and true operating conditions such as temperatures. Simulators and emulators are too slow to provide this capability. Actual programming of microcode ROM during development is very expensive and too time consuming to implement changes efficiently.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION

Figure 1:
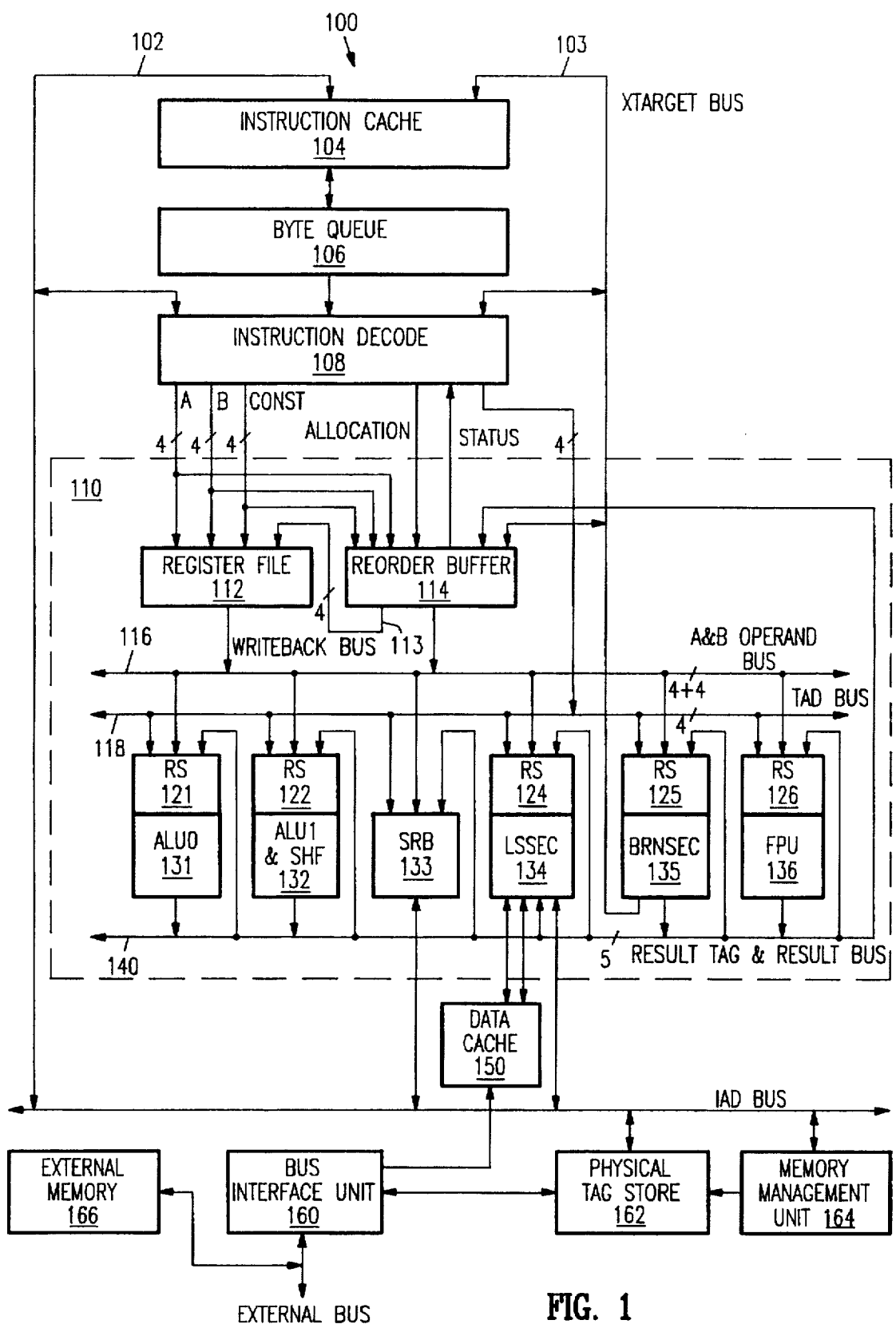
FIG. 1 is a architecture-level block diagram of a processor for achieving superscalar execution of a CISC instruction set.

A superscalar microprocessor integrated circuit includes an instruction decoder that incorporates a permanent memory in the form of microcoded ROM blocks. A microcode patch capability is implemented on this integrated circuit. Several patent applications describe various blocks in the instruction decoder and circuits associated with the instruction decoder. In particular, an instruction cache is described in further detail in U.S. patent application Ser. No. 08/145,905 filed on Oct. 29, 1993 (David B. Witt and Michael D. Goddard, "Pre-Decode Instruction Cache and Method Therefor Particularly Suitable for Variable Byte-Length Instructions," U.S. Pat. No. 5,689,672 issued Nov. 18, 1997 ). A byte queue is described in further detail in U.S. patent application Ser. No. 08/145,902 filed on Oct. 29, 1993 (David B. Witt "Speculative Instruction Queue and Method Therefor Particularly Suitable for Variable Byte-Length Instructions," abandoned in favor of a continuing Appln. No. 08/311,286, filed on Sep. 23,1994). A RISC core is disclosed in U.S. patent application Ser. No. 08/146,382 filed on Oct. 29, 1993 (David B. Witt and William M. Johnson, "High Performance Superscalar Microprocessor," abandoned in favor of a continuing application, now U.S. Pat. No. 5,651, 125 issued Jul. 22, 1997). A data cache and load/store circuit are further described in U.S. patent application Ser. No. 08/146,381, filed on Oct. 29, 1993 (David B. Witt, "Linearly Addressed Microprocessor Cache," abandoned in favor of a continuing application, now U.S. Pat. No. 5,623,619 issued Apr. 22, 1997). A physical tag store and the load/store circuit are further described in U.S. patent application Ser. No. 08/146,376, filed on Oct. 29, 1993 (William M. Johnson, David B. Witt, and Murali Chinnakonda, "High Performance Load/Store Functional Unit and Data Cache," U.S. Appln. No. 08/146,376, filed on Oct. 29, 1993). An instruction decoder, including a discussion of timing cycles, is described in further detail in U.S. patent application Ser. No. 08/146,383, filed on Oct. 29, 1993 (David B. Witt and Michael D. Goddard, "Superscalar Instruction Decoder", abandoned in favor of a continuing Appln. No. 08/628,389, filed on Apr. 5, 1996, now abandoned in favor of a continuing Appln. No. 08/912,622, filed on Aug. 6, 1997). Instruction format and timing information is set forth in more detail in Appendix E of a publication of the Intel Corporation entitled "Intel486™" Microprocessor Family: Programmer's Reference Manual, Santa Clara, Calif., 1992. All of the aforementioned patent applications and documents are incorporated herein by reference in their entirety.

An instruction format includes an operation code ("opcode") having one or two opcode bytes, a modify register or memory ("modRM") byte, a scale-index-base ("SIB") byte, displacement bytes, and immediate date bytes. The opcode specifies the operation code, and may also contain a register identifier. The modRM byte specifies whether an operand is in a register or in memory. If the operand is in memory, fields in the modRM byte specify the addressing mode to be used. Certain encodings of the modRM byte indicate that a second byte, the SIB byte, follows to fully specify the addressing mode. The SIB byte consists of a 2-bit scale field, a 3-bit index field, and a 3-bit base field. These fields are used in complex memory addressing modes to specify how address computation is done. The displacement byte is used in address computation. The immediate data byte is used for an instruction operand. One or more additional bytes, known as prefix bytes, may appear before the opcode byte. The prefix byte changes the interpretation of the instruction, adding additional complexity. The length of the instruction can vary as well. The minimum instruction consists of a single opcode byte and is 8 bits long. A long instruction that includes a prefix byte may be 104 bits long. Longer instructions containing more than a single prefix byte are possible as well.

An architecture of a superscalar processor 100 is shown in FIG. 1. The instruction addresses, data, and control transfers between the major functional blocks of the processor 100 as well as to and from external memory are communicated on an internal address and data ("IAD") bus 102, which is interfaced to an external bus (not show) by a bus interface unit ("BIU") 160 in conjunction with a physical tag store 162 and a memory management unit 164. The IAD bus 102 is a 64-bit bus. Another bus called the transfer target bus, or XTARGET bus 103, is a 32-bit bus with various prioritized uses, including updating an instruction decoder IDECODE 108 from the branch section BRNSEC 135 in the event of microbranch misprediction, exceptions, and resets; and updating a branch FIFO in the BRNSEC 135 from the IDECODE 108.

CISC instructions, illustratively instructions used by x86 class microprocessors (hereinafter x86 instructions), are parsed and pre-decoded in an instruction cache ("ICACHE") 104, the pre-decoded x86 instructions are copied to a byte queue ("BYTEQ") 106, and the pre-decoded x86 instructions are mapped in an instruction decoder ("IDECODE") 108 to respective sequences of instructions for RISC-like operations ("ROPs").

The ICACHE 104 is a first level instruction cache which identifies and marks raw x86 instruction start and end points and encodes "pre-decode" information. The BYTEQ 106 is a queue of instruction and pre-decode information of the "predicted executed" state. Depending on the number of ROPs the x86 instructions map to, up to four x86 instructions are possibly dispatched concurrently.

IDECODE 108 dispatches up to a plurality "m " of ROPs in parallel, wherein the ROPs are mapped from one or more CISC instructions. The apparatus includes a memory for storing a CISC instruction and pre-decode information, which includes a value identifying the number of ROPs to which the CISC instruction maps. A multiplexer having a plurality "m" of outputs is connected to the memory for directing information from the CISC instruction to unallocated ones of the multiplexer outputs equal to the number of ROPs to which the CISC instruction maps, up to "m" ROPs. A plurality of conversion paths are respectively connected to the multiplexer outputs for converting the CISC instruction information into respective ROPs to which the CISC instruction maps. Dispatch logic is connected to the conversion paths for dispatching the ROPs in a current dispatch window. The IDECODE 108 generates type, opcode, and pointer values for all ROPs based on the pre-decoded x86 instructions in the BYTEQ 106, and determines the number of possible x86 instruction dispatch for shifting the BYTEQ 106. The IDECODE 108 also maintains the program counter values of speculative ROPs, and maintains speculative mapping of floating point pointers for speculative floating point execution.

ROP instructions are dispatched to a superscalar RISC core 110 over various buses. The RISC core 110 supports four ROP issue, five ROP results, and up to sixteen speculatively executed ROPs. Up to four sets of pointers to the A and B source operands are furnished over respective buses by the IDECODE 108 to a register file REGF 112 and to a reorder buffer ROB 114 in the RISC core 110. The REGF 112 and ROB 114 in turn furnish the appropriate "predicted executed" versions of the RISC operands A and B to various functional units in the RISC core 110 via an A & B source operand bus 116. RISC opcode information is dispatched from the IDECODE 108 via a type and dispatch information ("TAD" ) bus 118.

The RISC core 110 includes numerous functional units such as a first arithmetic logic unit ("ALU0") 131, a second arithmetic logic and shift unit ("ALU1 & SHF") 132, a special register block ("SRB") 133, a load/store section ("LSSEC") 134, a branch section ("BRNSEC") 135, and a floating point unit ("FPU") 136. Functional units are dedicated to a particular type of function as in the ALU0 131, or may combine a plurality of functions as in the ALU1 & SHF 132 and the LSSEC 134. The functional units 131, 132, 133, 134, 135 and 136 include respective reservation stations 121, 122, 124, 125 and 126 having inputs connected to the operand bus 116 and the TAD bus 118. The reservation stations allow speculative ROPs to be dispatched to the functional units without regard to availability of source operands.

The REGF 112 is a physical register file which contains the mapped x86 registers for the integer and floating point instructions, and also contains temporary integer and floating point registers for holding intermediate calculations. The REGF 112 decodes up to two register pointers for each of up to four concurrently dispatched ROPs and furnishes the values of the selected entries onto the A and B source operand bus 116 as appropriate from the REGF 112 eight read ports. The REGF 112 includes four write ports for retiring speculative execution state operands from the ROB 114 over a writeback bus 113. The ROB 114 is a circular FIFO with head and tail queue pointers for keeping track of the relative order of speculatively executed ROPs. The storage locations are dynamically allocated to instruction results. When an instruction is decoded, the instruction result value is allocated a location, or destination, in the ROB 114, and destination-register number is associated with this location. For a subsequent instruction having no dependencies, the operand bus 116 is driven from the REGF 112. However, when a subsequent instruction has dependencies and refers to the renamed destination register to obtain the value considered to be stored therein, the instruction obtains instead the value stored in the ROB 114, or a tag for the location in the ROB 114 allocated to this value if the value is undetermined. The value or tag is furnished to the functional units over the TAD 118 bus. When results are obtained from completion of execution in the functional units 131–136, the results and their respective result tags are furnished to the ROB 114 over a four bus wide result tag and result bus 140, as well as to the reservation stations 121–122 and 124–126. The ROB 114 also handles exceptions and mispredictions, and maintains the state of certain visible registers, including the program counter and the execution flags.

The processor 100 of FIG. 1 uses in-order dispatch of ROPs from the IDECODE 108, out-of-order issue with respect to the issue of instructions among the functional units, in-order issue with respect to the issue of instructions to a functional unit from respective reservation station, and out-of-order completion. Accordingly, the IDECODE 108 is isolated from completion in the functional units of the RISC core 110 so that except for stalls, the IDECODE 108 continues to decode instructions regardless of whether they can be promptly completed. To take advantage of lookahead, the IDECODE 108 decodes instructions and places them into available locations in the reservation stations 121–122 and 124–126 of the functional units 131–132 and 134–136 as long as the reservation stations are unoccupied.

Data cache ("DCACHE") 150 is closely aligned to LSSEC 134, which handles both integer and floating point load and store operations. Up to two load operations simultaneously access the DCACHE 150 and forward operations to the result bus 140. LSSEC 134 performs cache hit/miss checking for data stored in DCACHE 150.

Processor 100 also includes physical tag store 162, the memory management unit 164, and a bus interface unit 160, which interfaces with a conventional external bus connected to a conventional external memory 166. The physical tag store 162 contains tags which relate to the contents of the ICACHE 104 and the DCACHE 150. Memory management unit 164 performs memory address conversions. Bus interface unit 160 takes requests for read/write cycles from the physical tag store 162, and watches read/write cycles on the external bus to ensure cache consistency in the physical tag store 162, the ICACHE 104, and the DCACHE 150 and, upon detection, to update, invalidate, or provide data as appropriate.

Byte Queue Characteristics

The BYTEQ 106 is an interface between the ICACHE 104 and the IDECODE 108. The byte queue BYTEQ 106 is a queue of up to sixteen entries representing zero, one or more pre-decoded x86 instructions. Each pre-decoded x86 instruction starts on an instruction start and ends on an instruction end, and consists of one or more elements. Each element includes a valid bit, an x86 instruction byte, pre-decode information of the predicted executed state, and branch misprediction information.

ICACHE 104 parses and pre-decodes the x86 instructions, and stores the results. As x86 instructions are dispatched from the BYTEQ 106 and subsequent x86 instructions are advanced to the head of the queue, the pre-decoded x86 instructions are copied into locations of the BYTEQ 106 as there is space available. If one or more prefixes are present in the raw x86 instruction, the pre-decoded x86 instruction includes one or more prefix elements. The last prefix element is a consolidated prefix element containing complete prefix information for the IDECODE 108, while the other prefix elements are re-coded prefix elements containing partial information and are not used by the IDECODE 108. An OPCODE element containing an x86 instruction opcode byte follows the prefix elements. If the raw x86 instruction performs special memory addressing, the pre-decoded x86 instruction includes a modRM element. If the raw x86 instruction requires certain addressing modes, the pre-decoded x86 instruction includes an SIB element. If the raw x86 instruction requires displacement information for address computation or contains immediate data, the pre-decoded x86 instruction includes a displacement/immediate data element.

BYTEQ 106 holds various instruction control information including: (1) a valid bit (BYTEQV|x|), (2) an instruction information byte (BYTEQx|7:0|), (3) predecode information and (4) branch misprediction information. The valid bit indicates whether the element of a pre-decoded x86 instruction is valid. The instruction information byte is selected from or derived from the bytes of the raw x86 instruction which contains re-coded prefix information, consolidated prefix information, opcode information, modRM information, SIB information, or displacement or immediate data information. Pre-decode information includes a bit (BYTEQP2|x|) indicating that an accompanying raw byte is an opcode byte, two bits (BYTEQP1 |x| and BYTEQP0 |x|) indicating the number of ROPs employed to execute the x86 instruction (Codes 00, 01, 10 and 11 respectively refer to one, two or three ROP x86 instructions or a microcode ROM entry point), a bit (BYTEQS|x|) indicating whether the accompanying raw byte is the first byte of an x86 instruction and a bit (BYTEQE|x|) indicating whether the accompanying raw byte is the last byte of the x86 instruction. The branch misprediction information includes a non-sequential indication (BYTEQNS|15:0|), a byte cache column indication (BYTEQCLM1 |15:0| and BYTEQCLM0 |15:0|).

ICACHE Overview

Figure 2:
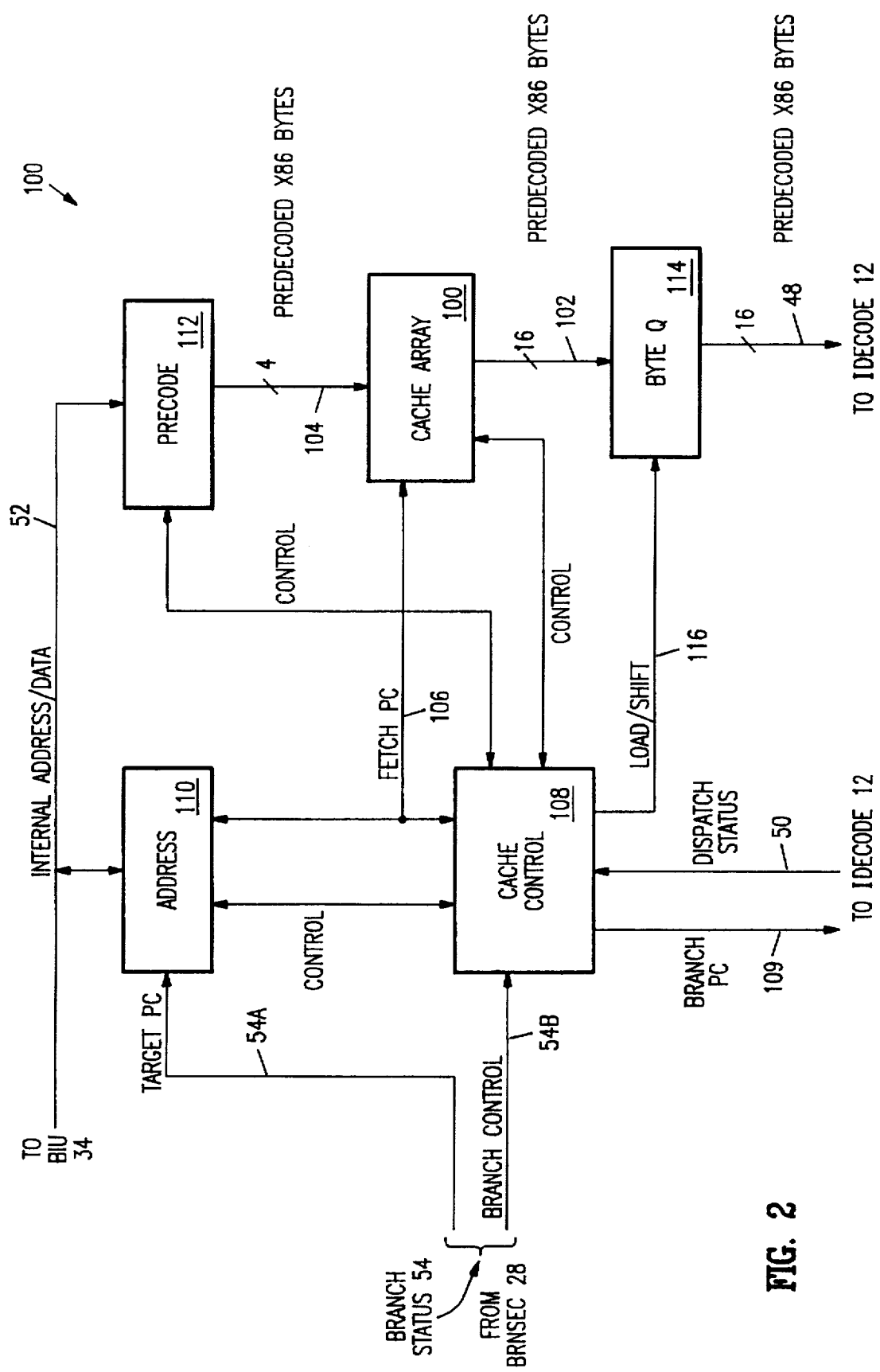
FIG. 2 is a block diagram of an instruction cache.

Referring to FIG. 2, the ICACHE 104 includes a cache control 208, which provides control signals to orchestrate the various operations of the ICACHE 104, an address block 210 which generally maintains a fetch program counter (the "Fetch PC") communicated on bus 206 for sequential and non-sequential accesses to the cache array 200, and provides address generation and X86 protection checking associated with pre-fetching instructions from either a secondary cache or external memory, a predecode block ("PREDECODE") 212 which receives pre-fetched X86 instruction bytes via the IAD bus 102, assigns predecode bits for each X86 instruction byte, and writes the predecoded X86 instruction bytes using a group of 4 busses 204 into a cache array 200, and a queue of predicted-executed instruction bytes (a "byte queue", or BYTEQ 106), which buffers predicted-executed instructions from the cache array 200 and presents up to 16 valid predecoded X86 instruction bytes to the IDECODE 108 on a group of 16 busses 248. The Fetch PC is preferably maintained as an X86 linear address.

In operation, the ICACHE 104 pre-decodes the X86 instruction bytes when initially prefetched to facilitate the parallel decoding and mapping of up to four X86 instructions into ROPs, and the parallel dispatch of up to 4 ROPs by the IDECODE 108, all within the same clock cycle.

Figure 3:
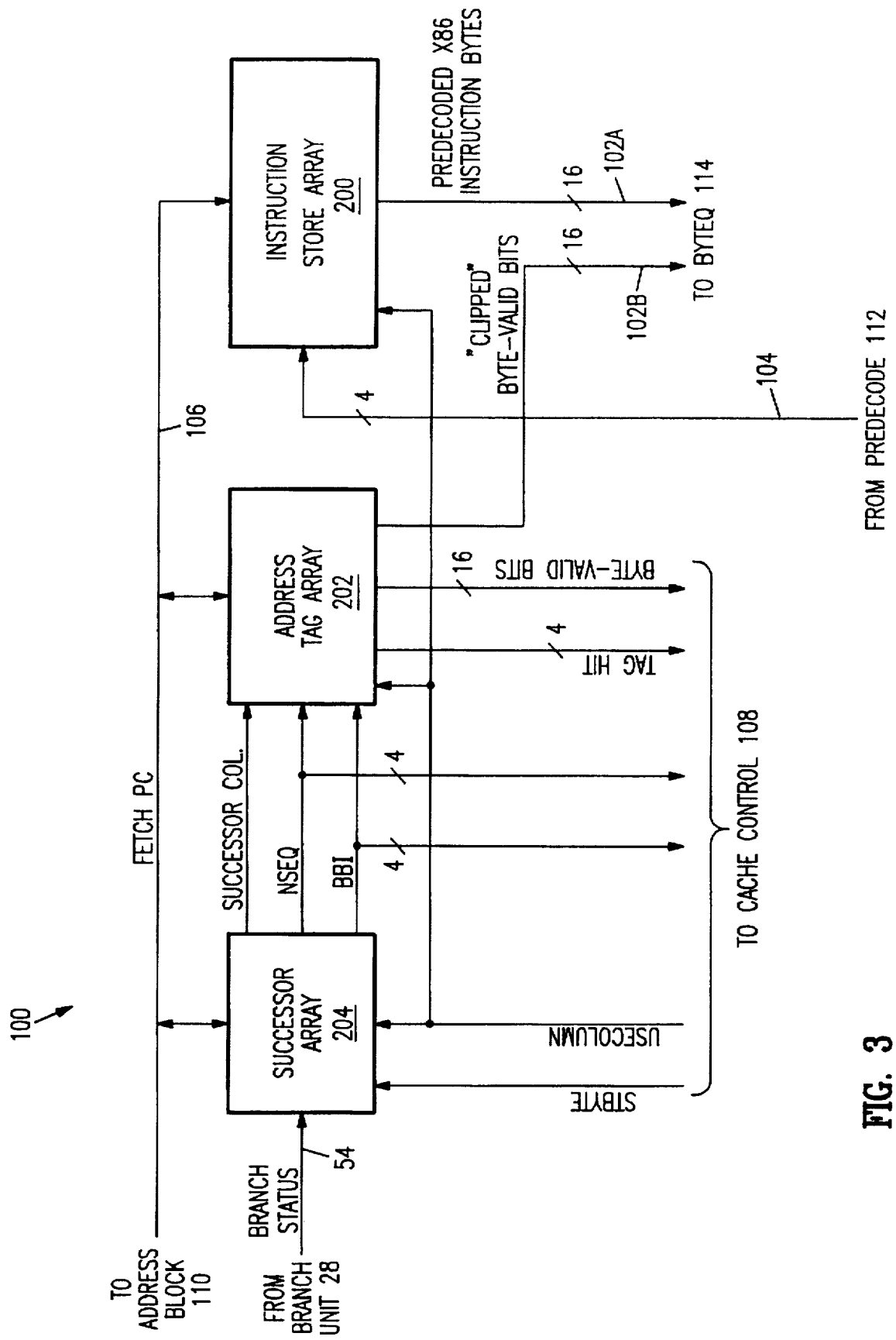
FIG. 3 is a block diagram of a cache array within the instruction cache shown in FIG. 3.

Referring now to FIG. 3, the cache array 200 is preferably organized into three main arrays: an instruction store array 300, an address tag array 302, and a successor array 304. Each of these three arrays are addressed by the Fetch PC address conveyed on bus 206. Middle-order bits of the Fetch PC address form a cache index which is used to address these arrays and retrieve an entry from each array, upper-order bits form an address tag which is compared to the tag stored within the retrieved entry from the address tag array 302 for detecting a cache hit, and lowest order bits form an offset into the retrieved entry from the instruction store array 300 to find the byte addressed by the Fetch PC.

The cache array 200 is organized as a 16K byte 4-way set-associative cache. The instruction store array 300 is organized as 1024 blocks of 16 predecoded X86 instruction bytes. The address tag array 302 is dual-ported and contains 1024 entries, each composed of a 20-bit linear address tag, a single valid bit for the entire block, and 16 individual byte-valid bits, one for each of the 16 corresponding instruction bytes within the instruction store array 300. The individual byte-valid bits, when asserted, each indicate that the corresponding predecoded X86 instruction byte contains a valid X86 instruction byte and valid predecode bits. After a cache miss an entry is allocated at the index location within the address tag array 302 by writing the upper 20 bits of the Fetch PC conveyed on bus 206 into the address tag, setting a tag valid bit to indicate a valid address tag, and clearing the sixteen byte-valid bits to invalidate any instruction bytes remaining in the corresponding entry within the instruction store array 300 from previous activity. The successor array 304 is dual-ported and contains 1024 entries, each composed of a 14-bit successor index, a successor valid bit (NSEQ) which indicates when set that the successor index stored in the successor array 304 should be used to access the instruction store array 300, and indicates when cleared that no branch is predicted taken within the instruction block, and a block branch index (BBI) which indicates, when the NSEQ is set, the byte location within the current instruction block of the last instruction byte predicted to be executed. The 14-bit successor index is composed of an 8-bit field used as the address index into the cache, a 2-bit field to indicate which column of the 4-way set-associative array contains the successor block of instruction bytes (thus avoiding the time otherwise required to determine which column "hits" at this address), and a 4-bit field which indicates the particular byte within the successor block which is predicted to be the next byte executed.

Figure 4:
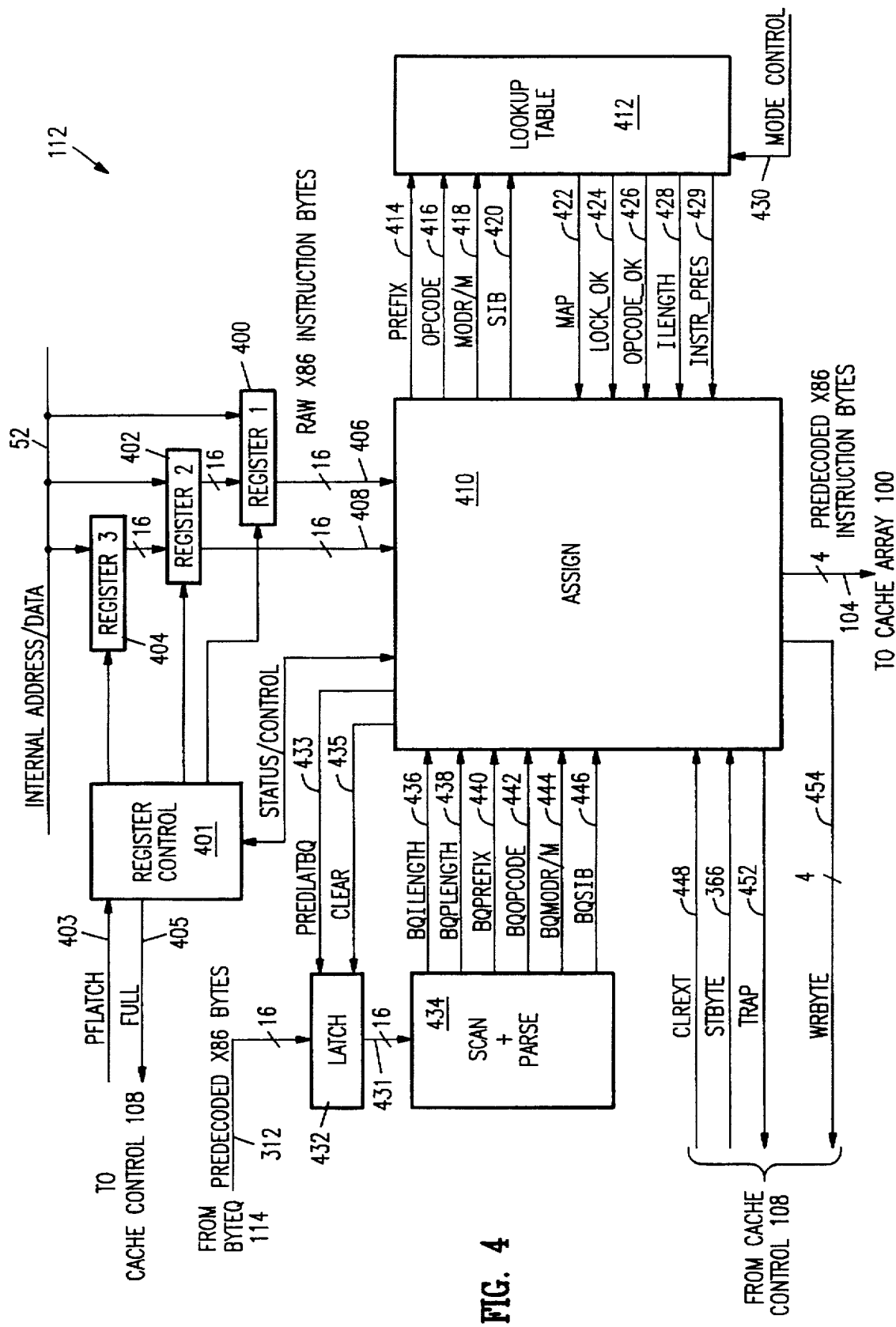
FIG. 4 is a block diagram of the predecode block illustrated within the instruction cache of FIG. 2.

Referring now to FIG. 4, the PREDECODE 212 includes registers 400, 402, and 404 for receiving prefetched instruction bytes conveyed on IAD bus 102 from an instruction source (which may include a secondary cache or external memory). A request to pre-fetch instructions is received from the cache control 208 upon a cache miss in the cache array 200. A register control 401 receives a prefetch latch (PFLATCH) signal conveyed on bus 403 from the cache control 208. This PFLATCH signal is asserted to indicate that the next available register 400, 402, or 404 should latch the instruction bytes present on the IAD bus 102. The register control 401 generates control signals for registers 400, 402 and 404 accordingly, and also asserts a FULL signal conveyed on bus 405 back to the cache control 208 when all three registers are full.

As many as 32 predecoded bytes are conveyed on busses 406 and 408 to an assign block 410 which scans the instruction bytes starting at the byte indicated by the STBYTE pointer conveyed on bus 466 from the cache control 208 and which corresponds to either the prefetch address or to the byte immediately following the last complete instruction prefetched. This first byte must be either a prefix byte or an opcode byte, and is marked as a starting byte. If one or more prefix bytes are encountered before the opcode byte, each prefix byte encountered is preferably recoded and also includes any prefix information from previously encountered prefix bytes. Thus, the last prefix byte before the opcode byte becomes a consolidated prefix byte containing prefix information from all previous prefix bytes encountered in the "raw" X86 instruction.

The opcode byte is marked, for example, by setting bit 10 in the field of predecode bits. The consolidated prefix byte is the byte immediately preceding the opcode byte, unless the opcode byte is also marked as the starting byte, which implies no prefix is present. The byte immediately following the opcode byte is tentatively assumed to be an X86 ModR/M byte, with the next byte tentatively assumed to be an X86 S-I-B byte. The four instruction fields PREFIX (being the consolidated prefix byte), OPCODE, ModR/M, and S-I-B are then conveyed on respective busses 414, 416, 418, and 420 to a lookup table 412. Mode control information is conveyed on bus 430 to the lookup table 412, which returns values for MAP, LOCKOK, OPCODEOK, ILENGTH, and INSTRPRES conveyed on respective busses 422, 424, 426, 428, and 429 back to the assign block 410.

The current instruction maps into the number of ROPs designated by the MAP value, which is a function of the specific operands as specified by any ModR/M and/or S-I-B byte, the mode of the processor, and the presence of any prefix bytes, among others. The predecode field contains P0 and P1 bits for the bytes of this instruction are set appropriately for the number of ROPs specified by the MAP value. The value LOCKOK indicates whether a lock prefix is valid for the particular instruction. An illegal instruction trap is generated when an invalid lock prefix precedes an opcode by asserting the TRAP signal conveyed on bus 452 to the cache control 208. A value OPCODEOK indicates validity of the opcode field and is also used to generate an illegal instruction trap when an illegal opcode is encountered. A value INSTRPRES conveyed on bus 429 indicates presence of sufficient instruction bytes to make proper determination of the other values communicated by lookup table 412. A value ILENGTH indicates the byte-length of the instruction, and is used to set the ending byte bit in the predecode field accordingly. With the end of the instruction found and all predecode bits assigned, the predecoded instruction bytes are conveyed, up to four bytes at a time, on bus 204 to the cache array 200. A WRBYTE signal is conveyed on bus 454 to the cache control 208 and designates respective predecoded bytes conveyed on bus 204 that are valid and should be written into the cache array 200.

In a variable byte-length instruction format such as the X86 format, a single instruction often crosses cache line boundaries when written into the cache array 200 so that a first portion of the instruction is stored within a given cache line (or cache block) when initially cached and the remaining portion of the instruction is stored within the following cache line. Subsequent memory references cause the cache line containing the remaining portion of the instruction to be allocated to a different memory location and written with unrelated instruction bytes. When the processor executes the given instruction again, the cache access will "miss" when attempting to access the second cache line. Such a partially cached instruction is detected by the cache control 208, which allocates a new cache line for the trailing bytes of the instruction and issues a prefetch of the instruction bytes, which are brought into the Predecode block 212 as before.

Rather than prefetching the cache line containing the beginning bytes of the partially cached instruction (which are already present in the cache array 200 and in the BYTEQ 106), beginning bytes of the instruction are instead loaded, upon the assertion of a PREDLATBQ signal conveyed on bus 433, from the BYTEQ 106 directly into a latch 432 via bus 412. These sixteen instruction bytes are conveyed on bus 431 to a scan and parse block 434 which locates the incomplete instruction within the 16 bytes from the BYTEQ 106. Up to four byte fields within the partial instruction and two values generated from the partial instruction are conveyed to the assign block 410 to provide a starting basis for the assignment of the predecode bits for the remainder of the instruction bytes. A BQILENGTH value, conveyed on bus 436, indicates the number of instruction bytes, beginning with the opcode byte, resident in the earlier cache line. A BQPLENGTH value, conveyed on bus 438, indicates the number of prefix bytes within the cache line occurring before the opcode byte. The consolidated prefix byte (BQPREFIX), the opcode byte (BQOPCODE), the ModR/M byte (BQMODR/M), and the S-I-B byte (BQSIB), if found within the current cache line, are conveyed on respective busses 440, 442, 444 and 426 to the assign block 410, which assigns predecode bits to the remaining bytes prefetched from memory and writes the remaining bytes into the cache array 200 as before. A CLEAR signal conveyed on bus 435 from the assign block 410 clears the latch 432 upon the successful writing of all instruction bytes for the instruction.

A CLREXT signal conveyed from the cache control 208 on bus 448 indicates a new prefetch address is forthcoming, and to clear the registers 400, 402 and 404 and discontinue predecoding of the former prefetch instruction stream.

IDECODE Overview

The IDECODE 108 is a two-stage pipelined decoder which receives pre-decoded x86 instruction bytes from the BYTEQ 106, translates them into respective sequences of ROPs, and rapidly dispatches ROPs from a plurality of dispatch positions. To maximize the opportunity for multiple instruction issue, the translation is handled in a hardwired fast conversion path for most simple instructions, which in the embodiment of FIG. 5 applied to x86 instructions which map to three ROPs or less. Instructions which require more than three ROPs and infrequently used instructions are handled by microcode sequences contained in microcode ROM. Whether an x86 instruction maps to multiple ROP instructions or microcode ROM, the pre-decoded x86 instruction information is duplicated at multiple dispatch positions to allow each dispatch position to work independently and in parallel with other dispatch positions.

Simple and common CISC instructions are encoded into one to three ROP sequences of primitive ROPs, which are then issued in parallel. The encoding is done for each dispatch position in a "fastpath," which decodes a CISC instruction into an ROP and issue it to the RISC core. The fastpath uses pre-decoded information accompanying each CISC instruction byte to determine where instruction boundaries are and the number of ROPs for each CISC instruction. IDECODE 108 determines whether ROPs for an x86 pre-decoded instruction are to be generated in the fastpath or the microcode ROM path. For example, information for ROP sequences either is generated by fastpath logic for up to four x86 instructions per cycle using up to four ROPs, or is read from microcode ROM for one pre-decoded x86 instruction. The information from the fastpath and the microcode ROM path which is required to generate an ROP includes the type of functional unit to which the ROP is designated to go, the specific simple RISC-like instruction to be executed at the functional unit, source and destination pointers for the ROP, size information of the ROP, addressing mode if a load or a store ROP, and immediate fields if any from the instruction for the ROP. Preferably, microcode ROM accesses are not mixed with fastpath decode, which avoids having to shift microcode ROPs. In the DECODE2 stage, the IDECODE 108 selects and augments the ROP information from either the fastpath or the microcode ROM and furnishes complete ROPs which are executed in the functional units 131-136.

The IDECODE 108 also controls shifting of the BYTEQ 106, so that fully dispatched pre-decoded x86 instructions are shifted out of the BYTEQ 106 and the next undispatched or partially dispatched pre-decoded x86 instruction is shifted to the "head of queue."

The IDECODE 108 also detects problems in the BYTEQ 106 and indirectly redirects the ICACHE 104 as appropriate by forcing a microcode entrypoint. The IDECODE 108 also accepts microcode ROM entry points initiated by cache refill logic in the ICACHE 104, and by exception and microbranch misprediction logic in the BRNSEC 135. Microcode entry points generated by the BRNSEC 135 are communicated to the IDECODE 108 over the XTARGET bus 103.

Figure 5:
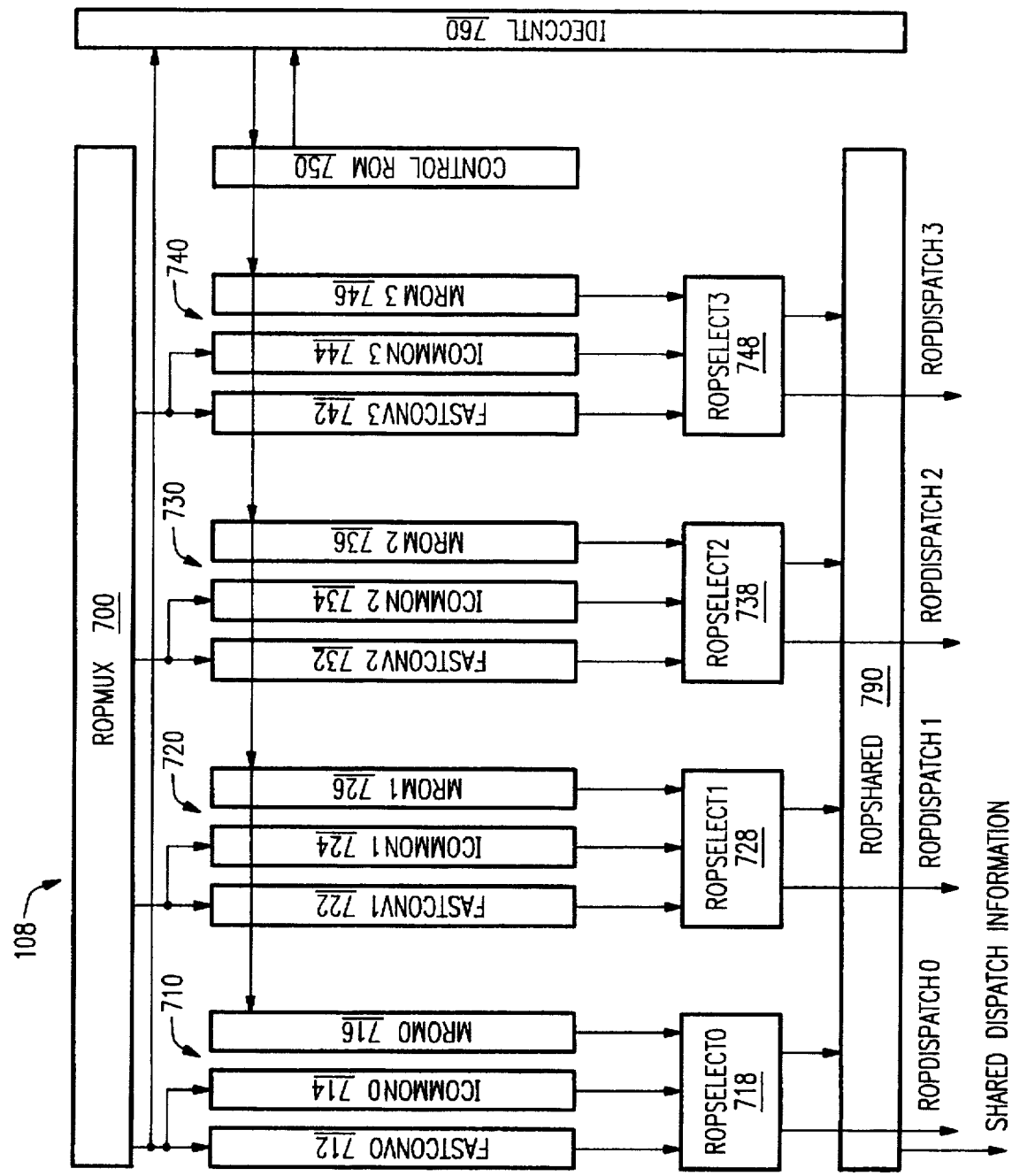
FIG. 5 is an architecture-level block diagram of an instruction decoder.

The architecture of the IDECODE 108 is shown in FIG. 5. An ROP multiplexer ROPMUX 700 directs entries of the BYTEQ 106 to four dispatch positions 710, 720, 730 and 740, which include respective fast converters FASTCONV0 712, FASTCONV1 722, FASTCONV2 732, and FASTCONV3 742; respective common stages ICOMMON0 714, ICOMMON1 724, ICOMMON2 734, and ICOMMON3 744; and respective microcode ROMs MROM0 716, MROM1 726, MROM2 736, and MROM3 746. MROM0 716, MROM1 726, MROM2 736, and MROM3 746 are controlled by microcode ROM controller IDECCNTL 760. These elements generally form the first stage of the IDECODE 108. The second stage of the IDECODE 108 generally is implemented in ROPSELECT0 718, ROPSELECT1 728, ROPSELECT2 738, and ROPSELECT3 748, and in ROPSHARED 790.

The IDECODE 108 is controlled by IDECCNTL 760 which performs general control functions such as furnishing instruction type information on the bus 118, predicting the number of ROPs in the current dispatch window to be accepted by the RISC core 110, informing the ICACHE 104 how to shift the BYTEQ 106 in view of the prediction, informing the ROPMUX 700 of the number of ROPs yet to be dispatched for the pre-decoded x86 instruction at the head of the BYTEQ 106, and accessing microcode and control ROM. To provide these functions, the IDECCNTL 760 receives various information from the functional units 131-136 of the RISC core 110 as well as from other units of the processor 100.

FASTCONVx 902 (FIG. 6 and FIG. 8) is representative of each of the fast converters FASTCONV0 712, FASTCONV1 722, FASTCONV2 732, and FASTCONV3 742. FASTCONVx 902 performs a fast conversion of many types of "simple" x86 instructions (i.e. those which map to 3 or fewer ROPs) into ROPs. The FASTCONVx 902 in each dispatch position converts the x86 instruction to a respective one of a sequence of ROPs (a sequence being one or more ROPS) needed to carry out the x86 instruction, and modifies the operation of the ROP for certain prefixes and SIB bytes.

Rarely used x86 instructions and x86 instructions requiring ROP sequences of more than 3 ROPs to execute are mapped to microcode ROM. Generally, the x86 instructions which map to more than three ROPs are the complex interactive instructions such as the CALL gate instruction, the STRING move instruction, and the transcendental floating point routines. In that event, control logic in the IDECODE 108 forms a microcode ROM address known as an entrypoint, and based on the entrypoint, reads the ROP sequence from the microcode ROM instructions stored in the MROM0 716, MROM1 726, MROM2 736, and MROM3 746 at four ROPs per cycle. MROMx 906 (FIG. 6 and FIG. 8) is representative of each of the microcode ROMs MROM0 716, MROM1 726, MROM2 736, and MROM3 746. MROMx 906 is a 1024×59 ROM array for handling x86 instructions which are not convertible in FASTCONVx 902.

The dispatch positions 710, 720, 730 and 740 also include respective pipeline stages ICOMMON0 714, ICOMMON1 724, ICOMMON2 734, and ICOMMON3 744. ICOMMONx 904 (FIG. 6 and FIG. 8) is representative of each of the pipeline stages ICOMMON0 714, ICOMMON1 724, ICOMMON2 734, and ICOMMON3 744. The ICOMMONx 904 is associated with the FASTCONVx 902 and MROMx 906 of the dispatch position x (x=0,1,2,3). Portions of x86 instruction conversion operations which can be effectively handled in a particular way regardless of whether the instruction is a fastpath or microcode ROM instruction, and which do not require generation in the MROMx 906, are carried out and pipelined, along with common data not requiring conversion, through ICOMMONx 904 in step with the processing of instruction portions in the various stages of FASTCONVx 902 or MROMx 906. ICOMMONx 904 also keeps track of register pointers which are used for performing address calculations used both by fastpath instructions and MROM instructions. Advantageously, the FASTCONVx 902 design and the MROMx 906 design are simplified. All x86 instructions use this logic.

Selector circuit ROPSELECTx 1500 (FIG. 8) is representative of each of the ROPSELECT0 718, ROPSELECT1 728, ROPSELECT2 738, and ROPSELECT3 748. ROPSELECTx 1500 selects either the outputs of the FASTCONVx 902 and the ICOMMONx 904, or the outputs of the MROMx 906 and the ICOMMONx 904, and generates dispatch information. ROPSELECTx 1500 also selects the immediate field constant values to drive immediate address or constants to the functional units 131–136. Another unit, ROPSHARED 790, is responsive to information from the ROPSELECTx 1500 in each of the dispatch positions 710, 720, 730 and 740 for generating dispatch information for resources that are shared by all dispatch positions.

The IDECCNTL 760 is a state machine for controlling the operation of the various units of the IDECODE 108. IDECODE 108 processes infrequently used x86 instructions and x86 instructions which map to a sequence of four or more ROPs using microcode ROM. An instruction positioned at the head of the BYTEQ 106 is driven by the ROPMUX 700 to all four dispatch positions 710, 720, 730 and 740, and processed in the ICOMMONx 904 units of the dispatch positions 710, 720, 730 and 740. The instruction is also supplied to the IDECNTL 760, which determines an entrypoint value for accessing the MROM0 716, MROM1 726, MROM2 736 and MROM3 746, and for accessing the control ROM 750. Based on the entrypoint, ROP information for the first, second, third and fourth ROPs in the sequence are read out of respective ROMs MROM0 716, MROM1 726, MROM2 736 and MROM3 746 and combined with respective signals from ICOMMON0 714, ICOMMON1 724, ICOMMON2 734 and ICOMMON3 744 to furnish the four ROPs.

The ROP Multiplexer ROPMUX

Figure 6A:
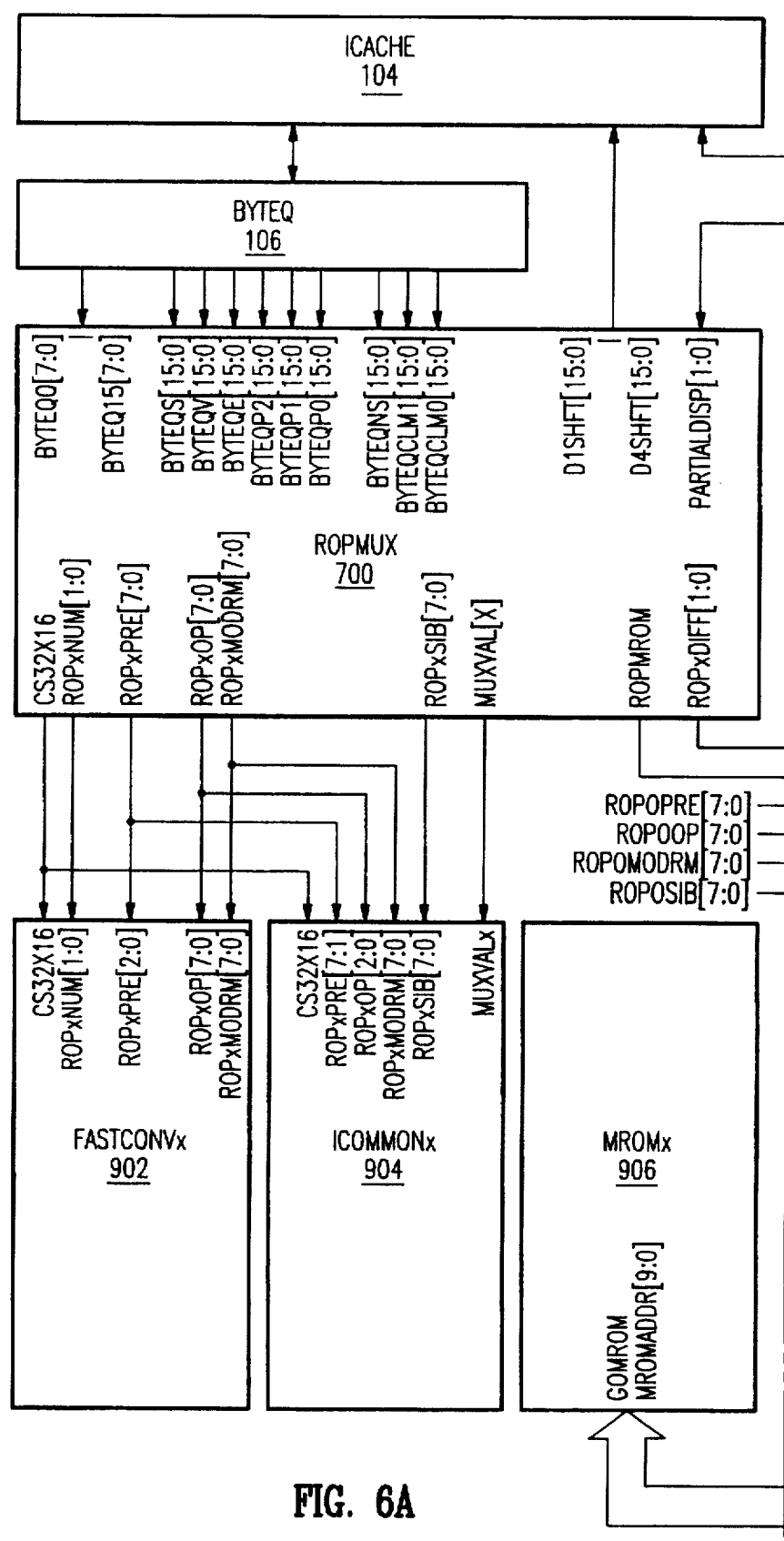
FIG. 6 is a data-address-control signal level block diagram showing interconnections between the ROP multiplexer of the instruction decoder of FIG. 5 and various other functional blocks of the processor of FIG. 1.
Figure 6B:
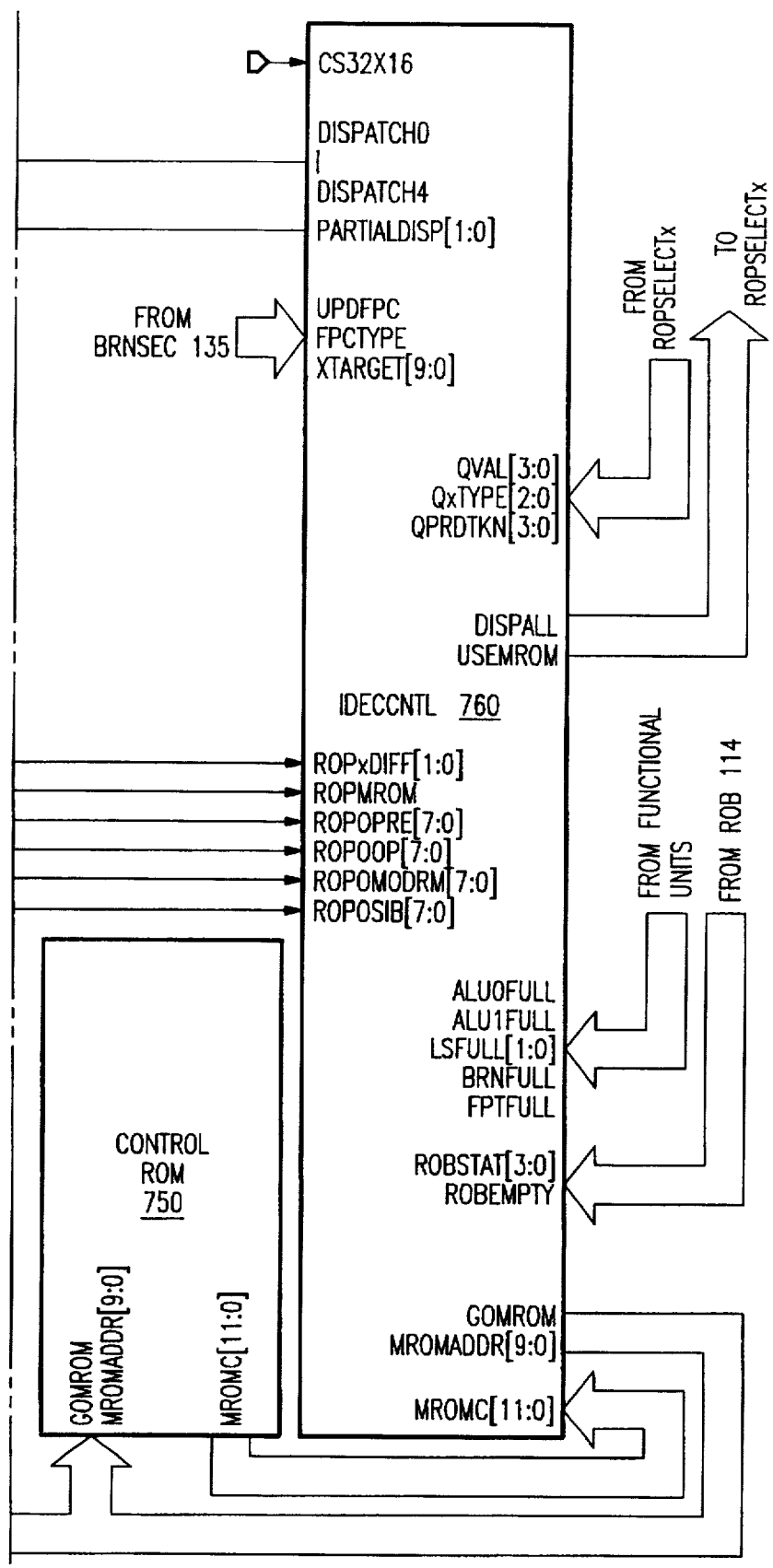

The ROPMUX 700, which is shown in FIG. 6 with connections to other IDECODE 108 elements and functional blocks allocates a complete pre-decoded x86 instruction in the BYTEQ 106 to one or more of the dispatch positions 710, 720, 730 and 740 in the IDECODE 108. One or more pre-decoded x86 instructions are directed concurrently from the BYTEQ 106 to available ones of the dispatch positions 710, 720, 730 and 740, beginning with the x86 instruction at the head of the BYTEQ 106.

A pre-decoded x86 instruction which does not map to microcode ROM and does not entirely fit in the dispatch window is allocated as many dispatch positions 710, 720, 730 and 740 as available in the first dispatch window. The IDECCNTL 760 uses a signal PARTIALDISP|1:0 | to determine whether some of the ROPs of the x86 instruction at the front of the dispatch window have been dispatched, so that the already dispatched ROPs are not allocated dispatch positions.

The byte queue entries of a pre-decoded x86 instruction which maps to microcode ROM and which resides at the head of queue of the BYTEQ 106 are directed to all four dispatch positions 710, 720, 730 and 740.

Elements of specific types of pre-decoded x86 instructions in the BYTEQ 106 are directed to dispatch positions in the IDECODE 108 by the ROPMUX 700. When the BYTEQ 106 becomes valid after a shifting operation, the ROPMUX 700 "scans" the BYTEQ 106 to identify and to obtain certain information about complete pre-decoded x86 instructions and the number of ROPs to which they map. To avoid unnecessary delay, the scanning preferably is performed essentially concurrently using either combinatorial logic or programmable array logic.

A scanning function performed by the byte queue identifies instructions in the BYTEQ 106, beginning at the head of queue, which collectively map to four ROPs. If the end of queue is encountered before four ROPs are detected, the byte queue scan function identifies all instructions in the BYTEQ 106. The instructions are identified by detecting their respective start bits in the array BYTEQS, and the number of ROPs associated with each instruction is determined by identifying opcode byte and detecting the value of ROP bits associated with the opcode byte. Complete instructions are identified by determining that the start bit of the instruction has an opposing end bit in the array BYTEQE. Bits BYTEQS identify the start of each instruction in the byte queue. Bits BYTEQP2 designate opcode bytes and bit pairs BYTEQP1 and BYTEQP0 the number of ROPs, hence the number of dispatch positions to be allocated to the instructions identified by BYTEQS.

ROPMUX 700 generates control signals ROPxNUM[1:0] indicating for the ROPs in the dispatch positions respective positions in the sequence of ROPs for a given instruction.

A determination is made of whether the pre-decoded x86 instruction at the head of the BYTEQ 106 is a microcode ROM-mapped instruction. When the pre-decoded x86 instruction at the head of the BYTEQ 106 is not a microcode ROM mapped instruction, dispatch positions 710, 720, 730 and 740 are allocated to predecoded x86 instructions depending on the number of ROPs to which each pre-decoded x86 instruction maps and the number of dispatch positions available. ROPxNUM for the dispatch positions allocated in this manner are assigned their respective values, control signal ROPMROM is not asserted, and MUXVAL [x] for each dispatch position is asserted. If any of the x86 instructions pending for the current dispatch window and not at the head of the BYTEQ 106 maps to microcode ROM, dispatch positions are still allocated. However, ROPxNUM for dispatch positions allocated in this manner is "don't care", since control signal ROPMROM is not asserted and ROPs dispatched from dispatch positions allocated to x86 instructions which map to microcode ROM but which are not at the head of queue are not marked valid (MUXVAL[x] for dispatch position x is not asserted). Invalid ROPs are not processed in subsequent pipeline stages of the processor 100.

Each dispatch position receives four elements from a pre-decoded x86 instruction stored in the BYTEQ 106. The four elements are a consolidated prefix data element, an opcode element, a modRM element, and a SIB element. If an element is not present in the pre-decoded x86 instruction, as determined from the start and end bits of the instruction, the information received at the dispatch position corresponding to the absent element is treated as "don't care" information.

The next heads of queue are determined for one, two, three and four ROPs dispatched. This information is used for shifting the BYTEQ 106.

When the pre-decoded x86 instruction at the head of the BYTEQ 106 is a microcode ROM mapped instruction, all four dispatch positions are allocated to the microcode ROM mapped instruction. For a microcode ROM mapped instruction, the value of BYTEQP1 and BYTEQP0 is 11. If the allocation of four dispatch position resources is not sufficient to complete dispatching of the ROP sequence to which the x86 instruction maps, the four dispatch position resources are again allocated to the microcode mapped instruction in the next cycle. ROPxNUM for dispatch positions allocated in this manner is "don't care" since it is not used, the dispatch positions are marked valid (MUXVAL |3:0| bits are asserted), and control signal ROPMROM is asserted since the microcode mapped x86 instruction is at the head of queue.

IDECCNTL 760 forms a microcode ROM entrypoint and accesses an ROP sequence contained in MROM0 716, MROM1 726, MROM2 736, and MROM3 746. Initially, the entrypoint is based on the ROP3PRE, ROP3OP, ROP3MODRM, and ROP3SIB elements in dispatch position three (MROM3 746) as well as on processor state information such as mode (real/protected) and priority level information obtained from the pre-decoded x86 instruction, and subsequently on other information from the microcode sequence. Forming of the microcode ROM entry point in dispatch position three possibly takes place in parallel with the dispatch, in dispatch positions one, two and three, of fastpath instructions.

The consolidated prefix data element, the opcode element, the modRM element, and the SIB element from the microcode mapped x86 instruction at the head of the BYTEQ 106 are furnished as the signals ROPxPRE, ROPxOP, ROPxMODRM, and ROPxSIB elements to all of the dispatch positions for use by ICOMMONx. If an element is not present in the pre-decoded x86 instruction, as determined from the start and end bits of the instruction, the information received at the dispatch position corresponding to the absent element is treated as "don't care" information.

The next heads of queue are determined for one, two, three and four ROPs dispatched. This information is used for shifting the BYTEQ 106 in the event that the microcode mapped x86 instruction is fully dispatched.

Various data, address, and control signals associated with the ROPMUX 700 become valid at different times to complete the instruction decode. Branching information is applied from the ICACHE 104 to the ROPMUX 700. Branch prediction is use in the processor 100 of FIG. 1 because the technique allows an adequate instruction-fetch rate in the presence of branches and is needed to achieve performance with multiple issue.

Sixteen raw bytes BYTEQx|7:0|, predecode information and branch information are applied from the BYTEQ 106 to the ROPMUX 700. Control signal PARTIALDISP|1:0| from the IDECCNTL 760 specifies the number of ROPs left to be dispatched for the x86 instruction at the head of the BYTEQ 106.

A number of signals are furnished to the dispatch positions including signal ROPxNUM|1:0| which is furnished to the FASTCONVx 902 to indicate whether the dispatch position is allocated to the first, second or third ROP in a particular ROP sequence, or is allocated to microcode ROM. Signal ROPMROM to the IDECCNTL 760 indicates whether the x86 instruction at the head of the byte queue is a microcode ROM instruction.

Signal ROPxDIFF|1:0| from ROPMUX 700 to the IDECCNTL 760 indicates the number of ROPs left in the allocated x86 instruction for each possible dispatch. IDECCNTL 760 uses ROPxDIFF to determine PARTIALDISP, the number of ROPs remaining to be dispatch for the pre-decoded x86 instruction at the head of queue in the next cycle. PARTIALDISP|1:0| is latched for the next cycle from one of the ROPxDIFF signals, selected on the basis of the number of ROPs predicted to be dispatched from the current dispatch window.

Signal MUXVAL|3:0| contains ROP valid bits for the dispatch positions 710, 720, 730 and 740 respectively. The bits of MUXVAL are respectively furnished by ROPMUX 700 to the ICOMMONx 904 blocks of the dispatch positions 710, 720, 730 and 740, which generate dispatch control signals based on their values. Signals ROPxPRE|7:0|, ROPxOP|7:0|, ROPxMODRM|7:0|, and ROPxSIB|7:0| are furnished in whole or in part to FASTCONVx 902, ICOMMONx 904, and IDECCNTL 760 (x=0,1,2,3) and are the prefix, opcode, modrm, and SIB bytes of the x86 instruction to which the dispatch position x is allocated.

The signals D1SHFT|15:0| through D4SHFT|15:0| from the ICACHE 104 indicate the positions of x86 instruction boundaries which correspond to ROPs mapped from the x86 instructions that are respectively dispatched at dispatch positions 0, 1, 2 and 3. Designation of the signal D1SHFT |15:0| through D4SHFT|15:0| which is to be used depends on an estimate determined by the IDECCNTL 760 and communicated to the ICACHE 104 as signals DISPATCH0 through DISPATCH4.

Signals furnished to the ROPSELECTx 1500 (see FIG. 8) include signal ROPxDI|63:0|, which contains the raw instruction bytes from the byte queue right justified according to the last byte of the allocated x86 instruction. For an instruction containing four byte displacement/immediate data, for example, ROPxDI|63:0| would contain the raw prefix byte, the raw opcode byte, the raw modify r/m byte, the raw SIB byte, and the four raw bytes of the displacement/ immediate data. Signal ROPPRDTKN|3:0| is the allocated non-sequential indication from the last byte of the x86 instruction. Signal ROPxCLM|1:0| is the allocated cache column indication from the last byte of the x86 instruction. Signal CS32X16 from the code segment register provides a 32 bit or 16 bit indication of processor state.

Control of Byte Queue Shift Operations

The BYTEQ 106 includes a barrel shifter that shifts from 0 to 15 locations in one cycle, shifting out pre-decoded instructions that have been dispatched as ROPs. Shifting of the BYTEQ 106 is controlled by signals D1SHFT|15:0| through D4SHFT|15:0| and DISPATCH0 through DISPATCH4, which advantageously are generated by the ROPMUX 700 and the IDECCNTL 760 respectively at appropriate times in the DECODE1 stage so that the BYTEQ 106 can be shifted in a timely manner for the next decode cycle.

BYTEQ 106 is shifted before the actual number of ROPs dispatched is known. The ROPMUX 700 first receives various input signals from the ICACHE 104. Later ROPMUX 700 indicates back to the ICACHE 104 by signals D1SHFT|15:0| through D4SHFT|15:0| how to shift the byte for each of the possible dispatch scenarios, i.e. the dispatch of 0, 1, 2, 3, or 4 ROPs. The ICACHE 104 uses this information to set up the load/shift logic for the BYTEQ 106. Still later, the IDECCNTL 760 communicates a prediction of the number of ROPs are going to be shifted out of the BYTEQ 106, and the ICACHE 104 shifts and fills the byte queue dynamically in phase one of the following DECODE1 stage. A prediction is used because information regarding the full status of the functional units and the ROP types depends on results of instructions that have not yet been executed.

ICACHE 104 evaluates D1SHFT|15:0| through D4SHFT |15:0|. The signals D1SHFT|15:0| through D4SHFT|15:0| from the ICACHE 104 indicate the positions of x86 instruction boundaries which correspond to ROPs mapped from the x86 instructions that are respectively dispatched at dispatch positions 0, 1, 2 and 3.

The prediction of the number of ROPs to be dispatched is performed in the IDECCNTL 760 and communicated to the ICACHE 104 by an appropriate one of the signals DISPATCH0 (no ROPs dispatched) through DISPATCH4 (four ROPs dispatched). Signals DISPATCH0 through DISPATCH4 select none of or a corresponding one of the signals D0SHFT|15:0| through D4SHFT|15:0|, which then controls the shifting of the BYTEQ 106.

Prediction is achieved by applying two rules. First, past predicted taken branches (next ROP nonsequential) are not dispatched to simplify program counter maintenance. Second, the two ROPs used for a floating point operation need to be dispatched in the same cycle and, in one embodiment, from the first two dispatch positions, or in an alternative embodiment, from two of the first three dispatch positions. Typically, if all ROPs are fastpath integer ROPs, the IDECCNTL 760 predicts a four ROP dispatch. Note that many different prediction rules are possible, even rules permitting past predicted taken branches to be dispatched and permitting two floating point ROPs of a floating point operation to be dispatched from any dispatch position and even from different dispatch windows, although the use of such rules would require greater speed for performing the more complex logical calculations.

The prediction is based on signals QVAL|3:0| and QPRDTKN|3:0| from the ROPSELECTx 1500 (FIG. 8), as well as the upper five bits of the raw x86 opcode byte. The signal QVAL|3:0| is a latched version of MUXVAL for predicting non-dispatch of invalid ROPs. The signal QPRDTKN|3:0| indicates whether ROPs in the dispatch window are in a predicted taken branch, is a phase two latched version of BYTEQNS|x|. QPRDTKN|3:0| is used in the prediction to detect past predicted taken branches (next ROP nonsequential) so that subsequent ROPs in the dispatch window are not dispatched.

The number of ROPs dispatched is not known until very late in a decoder timing cycle, based on various signals from the functional units 131-136 and from the ROB 114. These signals include the functional unit full signals ALU0FULL, ALU1FULL, LSFULL|1:0|, BRNFULL|1:0| and FPTFULL; the reorder buffer allocation indication ROBSTAT |3:0|; and the ROB empty indication ROBEMPTY. For each valid ROP at decode, the corresponding bit of ROBSTAT |3:0| indicates whether a location of the ROB 114 is available for allocation to it. The ROB empty indication ROBEMPTY is asserted to indicate when a serialization event can be initiated.

Because the prediction technique predicts a number which is equal to or greater than actual number of ROPs eventually dispatched, the actual number of ROPs dispatched may not agree with the predicted number. In this event, the IDECODE 108 stalls until the remaining undispatched ROPs are dispatched in subsequent cycles. The stall is controlled by signal DISPALL from the IDECCNTL 760 to the ROPMUX 700.

ROPMUX-FASTCONVx-ICOMMONx-ROPSELECTx Operation

FASTCONVx 902 and ICOMMONx 904 perform fast conversion of many types of "simple" x86 instructions into ROPs using signals received from the ROPMUX 700. Signals applied to the FASTCONVx 902 includes ROPxNUM which specifies the number of the ROP to be generated at ROP position x in the sequence of ROPs needed to execute the x86 instruction, wherein the total number of ROPs in the sequence is specified by bits BYTEQP1|a| and BYTEQP0|a| corresponding to the byte queue element "a" in which bit BYTEQP2|a| is set.

Signal ROPxPRE|2:0| from the ROPMUX 700 are bits from a consolidated prefix. Bit |2| indicates whether an operand size prefix is present. An operand size prefix inverts the sense of the default operand size specified by the default operand size attribute specified by the DefaultAttr flag in the code segment descriptor register CSdesc (not shown). Bit |1| indicates whether an address size prefix is present. An address size prefix inverts the sense of the default address size specified by the default address size attribute specified by the DefaultAttr flag in the code segment descriptor register CSdesc (not shown). Bit |0| indicates whether a two byte opcode is present. The ICACHE 104 detects all such two opcode instructions, and represents the first indicator opcode as ROPxPRE|0|.

FASTCONVx 902 in each of the dispatch positions converts ROPxOP|7:0| into appropriate signals for use by the ROPSELECTx 1500 in assembling a ROP control and data signals for dispatch position x and encoding operand and destination pointers. The selected ROP is an appropriate one of the ROPs in the sequence to which the raw x86 instruction maps, based on ROPxNUM|1:0| and determined in accordance with ROPxPRE|2:0| and ROPxMODRM [7:0]. The FASTCONVX 902 performs this functions for all of the simple x86 instructions, including, illustratively, register-to-register instructions, memory-to-register instructions, register-to-memory instructions, arithmetic instructions, shift instructions, and branching instructions.

Figure 8:
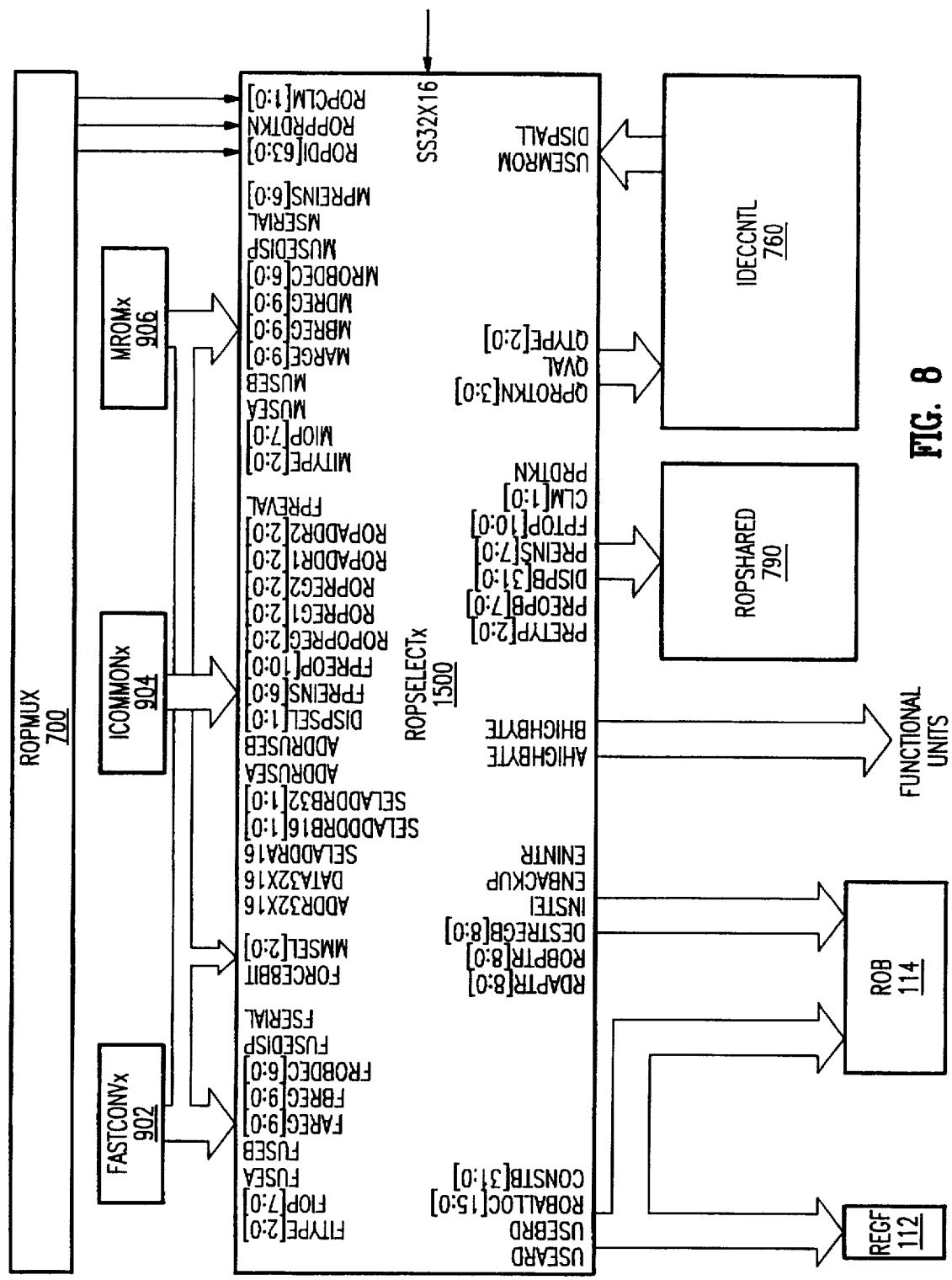
FIG. 8 is a data-address-control signal level block diagram showing interconnections between the ROP select functional block of the IDECODE and various other functional blocks of the processor of FIG. 1.

The signals at the output of the FASTCONVx 902 are ITYPE|2:0|, which indicates the type of ROP for selecting an appropriate one of the functional units; IOP|7:0|, which indicates the RISC opcode itself; USEA, which indicates that the A operand should be used in constructing the ROP; USEB, which indicates that the B operand should be used in constructing the ROP; AREG|9:0|, which contains the operand pointer into the REGF 112 and the ROB 114 for the A operand; BREG|9:0|, which contains the operand pointer into the REGF 112 and the ROB 114 for the B operand; DREG|9:0|, which contains the destination pointer into the REGF 112 and the ROB 114; ROBDEC|6:0|, which furnishes integer and floating point flag update control information to the ROB 114; USEDISP, which indicates that the displacement field should be used; SERIAL, which provides for a serialization event such as state variable updates and test variable reads by indicating that the pipeline must empty before further ROPs are dispatched; FORCE8BIT, which indicates that the operation is a byte-oriented operation, and IMMSEL|2:0|, which indicates what portions of the immediate data should be selected. These signals are furnished to ROPSELECTx 1500 under the same name but with an "F" prefix, as shown in FIG. 8.

ICOMMONx 904 in each of the dispatch positions pipelines and converts input signals into control signals for use by the ROPSELECTx 1500 in encoding ROPs, and also provides certain information for floating point operations.

The ICOMMONx 904 performs this functions for all x86 instructions, including the simple instructions converted in FASTCONVx 902 as well as the rarely used and complicated instructions read out of the MROM0 716, MROM1 726, MROM2 736, and MROM3 746 under control of the IDECCNTL 760.

Input signals to the ICOMMONx from the ROPMUX 700 include bits ROPxPRE|7:1| are from the consolidated prefix byte, if present. Bits |7:5| indicate whether a default segment should be overridden, and if so, by which segment descriptor. Bits |4:3| indicate whether a lock prefix or a repeat prefix is present, and if so, which prefix. Bit |2| indicates whether an operand size prefix is present. Bit |1| indicates whether an address size prefix is present.

The ICOMMONx 904 isolates certain bits of the input signals ROPxOP|2:0|, ROPxMODRM|7:0| and ROPxSIB |7:0|, which it furnishes to the ROPSELECTx 1500 for the determination of destination and operand pointers as well as register selection and other control information. Register pointers may appear in any one or more of five locations: bits |2:0| of the opcode byte, bits |5:3| of the modrm byte (REG1), bits |2:0| of the modrm byte (REG2), bits |5:3| of the SIB byte (ADDR1), bits |2:0| of the SIB byte (ADDR2). These bits are used by the FASTCONVx 902 for obtaining opcode and register information for ROP instructions, which is contained in signals ROPOPREG|2:0|, ROPREG1|2:0|, ROPREG2 |2:0|, ROPADDR1 |2:0|, and ROPADDR2 |2:0|.

MUXVAL|3:0| contains four valid bits for respective ROPs in the four dispatch positions. Each bit MUXVALx for dispatch position x is obtained from the valid bit of the pre-decoded x86 instruction from which the ROP in the dispatch position x is obtained. MUXVALx for an ROP in dispatch position x is asserted only if the pre-decoded source x86 instruction of the ROP is valid and the ROP itself is valid.

The signals at the output of the ICOMMONx 904 are furnished to the ROPSELECTx 1500. Many of the signals pertain to memory operand encoding. Signal ADDR32X16 indicates whether the address size is 32-bit or 16-bit. Signal DATA32X16 indicates whether the operands of the instruction are doubleword or word. Signal SELADDRA16 pertains to the A operand, and controls selection of the BX register or the BP register in the 16-bit addressing mode. Signal SELADDRB16|1:0| pertain to the B operand, and controls selection of the BX, BP, SI or DI registers in the 16-bit addressing mode. Signal SELADDRB32 [1:0] indicates whether REG2, ADDR1 or ADDR2 is used in the 32-bit addressing mode. In this manner, all x86 addressing modes for the fastpath and the microcode mapped path are handled in common. Signal ADDRUSEA indicates whether to use the A operand, which is not used in all addressing modes. Signal ADDRUSEB indicates whether to use the B operand, which is not used in all addressing modes. Signal DISPSEL|1:0| indicates how the displacement field is handled, and is interpreted as follows: 0xx binary - zero extend; 1xx binary - sign extend to 32 bits; x00 binary - none; x01 binary - 8 bit; x10 binary - 16 bit; x11 binary - 32 bit. Signal FPREINS|6:0| is a pre-instruction load/store signal which acts as a mode override for the LSSEC 134. When asserted, bit 6 forces the 32-bit addressing mode without changing the processor state. When asserted, bit 5 forces a locked access. When 0, bit 4 commands the use of the address segment indicated by the x86 instruction; when 1, bit 4 indicates that the segment is specified in bits [3:0]. Some of the signals are used in floating point operations. Signal FPREOP[10:0] contains bits ROPxMODRM|2:0| and ROPxOP|7:0|. Signal FPREVAL is a latched version of MUXVAL.

ROPMUX-IDECCNTL-MROMx-ROPSELECT
Operation

Complicated instructions, i.e. those requiring four or more ROPs, and infrequently used instructions are encoded using an entrypoint into microcode ROM. At the entrypoint, no additional CISC instructions are issued, so that the full issue width is available for the complex instruction. The routines issue from the four ROP positions. Microcode ROM instruction sequencing is controlled by the IDECCNTL 760, which establishes an entrypoint based on prefix, opcode, modRM, SIB, processor state, and exception information, and uses the entrypoint for reading an ROP sequence from the MROM0 716, MROM1 726, MROM2 736, and MROM3 746 at four ROPs per cycle. The sequencing logic is located in the IDECCNTL 760, which receives signal MROMC |11:0| from the control ROM 750 and furnishes signals GOMROM and MROMADDR|10:0| to access the MROM0 716, MROM1 726, MROM2 736, MROM4 746, and the control ROM 750.

Sequencing of ROPs is controlled as follows. Signal ROPMROM is asserted when a microcode mapped pre-decoded x86 instruction is at the head of the BYTEQ 106. IDECCNTL 760 determines the MROM entrypoint based on four elements received from the microcode mapped x86 instruction at the head of the BYTEQ 106. The four elements are a consolidated prefix data element, an opcode element, a modRM element, and a SIB element. If an element is not present in the pre-decoded x86 instruction, as determined from the start and end bits of the instruction, the information received at the dispatch position corresponding to the absent element is treated as "don't care" information.

Figure 7:
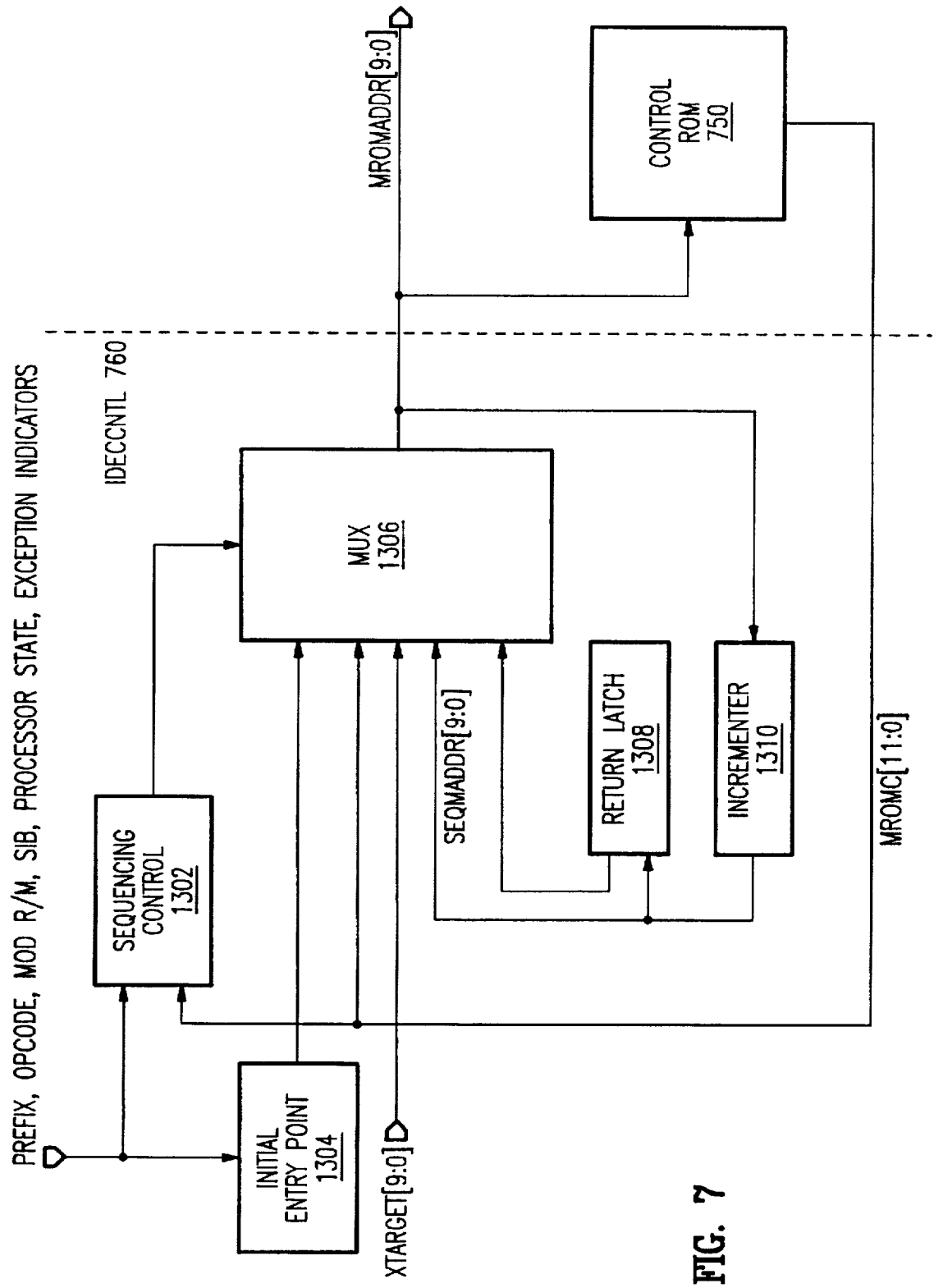
FIG. 7 is a functional block diagram of a microcode ROM controller useful in the instruction decoder of FIG. 5.

IDECCNTL 760 uses signals ROP0PRE, ROP0OP, ROP0MODRM, and ROP0SIB for accessing MROMx 906. FIG. 7 is a block diagram of the MROM control portion of the IDECCNTL 760. The IDECCNTL 760 accesses the MROMx 906 of the several dispatch positions. Sequencing control logic 1302 is a state machine of which controls a multiplexer 1306 for furnishing microcode ROM entrypoint addresses on MROMADDR|10:0|. The sequencing control logic 1302 is responsive to a control word from the control ROM 750, and the prefix, opcode, modRM, SIB, processor state, and exception indication signals from various units of the IDECODE 108 and other units of the processor 100. An initial microcode entrypoint is generated by an initial entry point generator 1304.

For accessing MROM0 716, MROM1 726, MROM2 736, and MROM3 746 at the beginning of a particular microcode ROM sequence, the output signal of the initial entrypoint generator 1304 is selected by the multiplexer 1306 and applied to the control ROM 750 as well as to the MROMx 906 in each of the dispatch positions x. Subsequent MROMx 906 accesses are selected from an incrementer 1310, a return latch 1308, and the bus XTARGET[9:0], depending on the sequencing mechanism. The positions of the ROPs in the MROMx 906 are fixed. Accordingly, all ROPs in a particular line are dispatched before those in the next line are dispatched.

Sequencing of ROPs is controlled using a sequence control field and the microbranch ROPs. The sequence control field takes effect when the MROMx 906 is accessed. Microbranch ROPs are dispatched to the BRNSEC 135 for execution, and have a delayed effect.

The sequence control field provides several capabilities through the incrementer 1310 and the return latch 1308: microcode subroutine call/return (single level supported), unconditional branching to any MROM location on a block aligned basis, conditional branching within plus or minus thirty-two blocks based on the processor state, and indicating end-of-sequence. The control words of the sequence control field are stored in the control ROM 750, which contains 1024 control words. Each control word is 12 bits in length. One control word applies to each "group of four" dispatch window. Each control word is interpreted in a manner dependent on the control word leading bits. If control ROM bits |11:10| are 00, a "miscellaneous control" format field is indicated. Bits |9:8| of the miscellaneous control format field are 00 binary to indicate a sequencing implemented by the incrementer 1310, are 01 binary to indicate an unconditional branch to the value contained in the return latch 1308 after the four ROPs in the current dispatch window are dispatched, and are 10 to indicate an exit. If control ROM bits |11:10| are 01, an unconditional branch is indicated, with the branching address being indicated by bits |9:0|. If control ROM bits |11:10| are 10, a conditional branch is indicated to SEQMADDR|9:5| || "branch taken address" based on a "condition specifier" (testing prefixes, opcode, modRM, SIB, processor state, or exception indications) after the four ROPs in the current dispatch window are dispatched. The condition is specified by bits |9:6| and the branching offset is specified by bits |5:0|. If control ROM bits |11:10| are 11, a call target is indicated, with the target being indicated by bits |9:0|. A "call target" causes an unconditional branch to a "subroutine entrypoint" after the four ROPs in the current dispatch window are dispatched, and the return latch 1308 is updated with the next sequential address. Note that the microsubroutine call control word is also useful as an unconditional branch absolute if the "return latch 1308" is not currently valid.

Microbranch ROPs are performed like instruction-level branches, being dispatched to the BRNSEC 135 for execution and subject to correction on mispredictions. Microbranches are distinguished from instruction-level branches by the decode position of the microbranch and an exit code in the sequence control field. Instruction-level branch ROPs are the last ROP in a sequence, and hence appear in the fourth dispatch position with a sequence exit code. Other branches are considered microbranches. Bit|0| in INSBRN accompanies the ROP to the BRNSEC 135. Also an MROM address is sent rather than an instruction address for target address formation or branch correction. On a microbranch correction, the BRNSEC 135 indicates to the IDECODE 108 via the XTARGET bus 103 that the correction address is an MROM address rather than a PC. Microbranch ROPs basically offer an unconditional branch capability and conditional branching based on a register value being zero, non-zero, positive, or negative.

The ROPSELECTx and ROPSHARED

The ROPSELECTx 1500, which is present in each dispatch position, selects information from the FASTCONVx 902, ICOMMONx 904, MROMx 906, and ROPMUX 700 and directs this information to the REGF 112 and the ROB 114, as well as to various functional units of the processor 100. The ROPSELECTx 1500 also furnishes information to ROPSHARED 790 for dispatch to shared resources. Information dispatched includes an A operand pointer, a B operand pointer, a destination pointer, information on the instruction type, the instruction opcode, interrupt enable, backup enable, and instruction end, and constant values. The various data and control paths between the ROPSELECTx 1500 and other elements of ICACHE 104 and the register file REGF 112, the reorder buffer ROB 114, and an illustrative functional unit FU are shown in FIG. 8.

Various input signals associated with the ROPSELECTx 1500 include SS32X16, the 32 bit or 16 bit indication from the stack segment register, is a processor state related signal. The signal is in effect changed in a serial manner and so is static when IDECODE 108 is active.

ROPDI|63:0| contains the raw instruction bytes from the BYTEQ 106 right justified according to the last byte of the allocated x86 instruction. ROPPRDTKN is the allocated non-sequential indication from the last byte of the allocated x86 instruction, and is used by the BRNSEC 135 to determine whether branch was predicted taken or not taken when the instruction was read out. ROPCLM|1:0| is the allocated cache column indication from the last byte of the allocated x86 instruction, and is used to access the appropriate locations of the ICACHE 104 during cache update.

USEMROM indicates when asserted that the ROPSELECT MROMx 906 inputs should be used instead of the FASTCONVx 902 inputs. The ROPSHARED 790 allocates dispatch information to shared resources according to valid types. ROPVAL|3:0| are the ROP valid bits from the IDECCNTL to the ROB 114. The ROPSHARED 790 also receives signals from the ROPSELECTx 1500 in each of the dispatch positions for processing and dispatch to shared resources.

Instruction type information PRETYP|2:0| is selected from MITYPE and FITYPE based on USEMROM. Opcode information PREOPB|7:0| assumes the value MIOP or FIOP based on USEMROM, although PREOPB|7:6| is replaced by the destination size DESTSIZE for some opcode types.

DISPxB[31:0] is the 32-bit displacement field which is selected from ROPDI|63:0| depending on the value of DISPSEL|1:0| and FUSEDISP and MUSEDISP as follows. DISPSEL|1:0| is determined from the address mode and is interpreted as follows: 00 binary - none; 01 binary - 8 bit, sign extend to 32 bits; 10 binary - 16 bit, sign extend to 32 bits; and 11 binary - 32 bit. FUSEDISP/MUSEDISP determines whether or not the displacement should actually be used. When FUSEDISP/MUSEDISP is not asserted, a zero displacement is supplied. PRExINS|7:0| is extra opcode information for loads and stores, with PREINS|7:6| being scale bits, PREINS|5| being an address "32X16" bit, PREINS|4| being a lock bit, and PREINS|3:0| being segment bits. PRExINS is selected from the fast path pre-instruction information FPREINS or from the microcode ROM pre-instruction information MPREINS in accordance with USEMROM and DISPALL. FPTOPx|10:0| is a delayed version of FPREOP|10:0|. CLMx|1:0| is the cache column from the last byte of the x86 instructions, a delayed version of ROPCLM. PRDTKN|3:0| is the non-sequential indications, a delayed version of ROPPRDTKN.

The ROPSELECTx 1500 in each of the dispatch positions and the ROPSHARED 790 cooperatively select operands for instructions dispatched to the various functional units of the processor 100. The REGF is illustratively a large set of general purpose registers. The register number is simply decoded by the REGF 112, and the value in the selected entry is provided. In contrast, the ROB 114 is a unit which contains a number of storage locations which are dynamically allocated to instruction results. When an instruction is decoded, the instruction result value is assigned a reorder-buffer location, and destination-register number is associated with this location, in effect renaming the destination register to the reorder buffer location. When a subsequent instruction refers to the renamed destination register to obtain the value stored in the register, the instruction obtains instead the value stored in the reorder buffer or a tag (the index into the reorder buffer) for this value if the value has not yet been computed. To provide this capability, the ROB 114 is illustratively implemented as a content addressable memory, so that the ROB 114 compares the register number to the register numbers in all entries, and returns the value or tag in the entry which has a matching register number, if any.

When an instruction is decoded, the register numbers of the source operands are used to access the ROB 114 and the REGF 112 simultaneously. If the reorder buffer does not have an entry whose register number matches the source register number, then the value in the register file is selected as the operand. If the reorder buffer does have one or more matching entries, the value of the most recent entry is selected if available, and otherwise the tag for the value is selected. Either the value or the corresponding tag is copied to an appropriate one of the reservation stations of the various functional units in the processor 100.

The operand furnishing function is implemented using various output signals of the ROPSELECTx 1500 and the ROPSHARED 790 furnished to the REGF 112 and the ROB 114. Signals USEARD, USEBRD, and ROBALLOC are applied from the ROPSELECTx 1500 to the REGF 112 and the ROB 114, and signals RDAPTER, RDBPTR, and DESTREGB are applied from the ROPSELECTx 1500 to the ROB 114. USEARD is a register use indicator to the ROB 114 and the REGF 112. USEARD is derived from FUSEA, MUSEA,and ADDRUSEA depending on respectively whether the x86 instruction is being processed in the FASTCONVx 902, is being processed in the MROMx 906, or involves a special x86 address mode. USEBRD is the B operand version of USEARD, and is derived in a manner similar to USEARD. ROBALLOC|15:0| indicates ROP allocation information and is derived from FROBDEC or MROBDEC depending on USEMROM and DISPALL. ROBALLOC contains 4 bits of allocation data for each valid ROP at decode, encoding requirements for register writeback in bit [3] and requirements for integer/floating point flag modifications in bits |2:0|. RDAPTR|8:0| is the A source operand pointer to the ROB 114. Generally, RDAPTR|6:3| is derived from inputs ROPOPREG, ROPREG1, and ROPREG2 from ICOMMONx 904 when the instruction involves a destination or a source register, or a special x86 address mode. However, RDAPTR is obtained from FAREG or MAREG when the x86 instruction is being processed in the FASTCONVx 902 or in the MROMx 906. RDBPTR|8:0| is the B operand version of RDAPTR, and is derived in a manner similar to RDAPTR except from the B operand version of the input signals. DESTREGB|8:0| is the destination pointer to the ROB 114, and is derived in a manner similar to RDAPTR except from the destination version of the input signals.

Dispatched instructions also require type and opcode information, which is furnished by the IDECCNTL 760. Signal INSDISP|3:0| indicates the dispatch positions from which ROPs are to be dispatched in the current cycle. Each of the type signals INSxTYPE|2:0| alerts a particular functional unit to process an instruction from dispatch position x. A different type signal is used for each of the functional units, which provides various capabilities. Signal XINSDISP|3:0| indicates which ROPs are dispatched. Signal WRITEFIFO indicates whether the BRNSEC 135 should write a predicted taken address on the XTARGET bus into a prediction FIFO. Signal COMMIT indicates whether a serialized event is being dispatched.

Signals RDFLGPTR and USEFLGRD are applied from the ROPSHARED 790 to the REGF 112 and the ROB 114. RDFLGPTR|2:0| is the integer flag source operand pointers and is set to the appropriate RDxFLGPTR|2:0| based on the dispatch position of the first undispatched ROP mapped to the branch section BRNSEC 135. If none of the ROPs is mapped to the branch section BRNSEC 135, RDFLGPTR |2:0| is set to 0. USEFLGRD|1:0|, which is the usage indication, is encoded to indicate the dispatch position of the first undispatched ROP mapped to the branch section BRNSEC 135.

Remaining signals are applied from the ROPSELECTx 1500 and the ROPSHARED 790 to the ROB 114 and, in some cases, REGF 112. CONSTB|31:0| is the 32-bit constant field to the REGF 112, and is selected from ROPDI |63:0| depending on the value of IMMSEL|2:0| and FUSEB and MUSEB as follows. IMMSEL|2:0| is determined from the 486 instruction and is interpreted as follows: 0xx binary - zero extend; 1xx binary - sign extend to 32 bits; x00 binary - none; x01 binary - 8 bit; x10 binary - 16 bit; x11- binary - 32 bit. When FUSEB/MUSEB is asserted, a zero constant is supplied. When FUSEB/MUSEB is not asserted, a constant is selected based on FBREG|9:8|/MBREG|9:8| as follows: 00 binary - none; 01 binary - use x86 instruction immediate data; 10 binary - 8 bit constant from FBREG |7:0|/MBREG|7:0|, no sign extend; 11 binary - 8 bit constant from FBREG|7:0|/MBREG|7:0|, sign extend. In addition, the 8 bit constant can be extended to 16 bits when FUSEA/MUSEA is not asserted and FBREG|9|/MBREG|9| is asserted. INSTEI is the instruction end information for the ROB 114, and is used in program counter maintenance. ENINTR is the external interrupt enable indication for the ROB 114. INSTEI and ENINTR are derived from FROBDEC or MROBDEC depending on USEMROM and DISPALL. FPTOPC|10:0|, which is the floating point opcode of the last x86 floating point instruction executed and which is used for state updating upon retiring of the floating point instruction, is set to the appropriate floating point opcode ROPxOP|2:0| || ROPxMODRM|7:0| based on the dispatch position of the first undispatched ROP mapped to the floating point section. If none of the ROPs is mapped to the floating point section, FPTOPC|9:0-| is "don't care."

The ROPSELECTx 1500 and the ROPSHARED 790 dispatch information to various functional units in the processor 100. The ROPSELECTX 1500 in each of the dispatch positions furnish AHIGHBYTE and BHIGHBYTE, which are the source operand high byte indications to the functional units. AHIGHBYTE is derived from FAREG and BHIGHBYTE is derived from FBREG. The ROPSHARED 790 furnishes INSOPxB|7:0| (x=0, 1,2,3), which are the instruction ROP opcode encodings and are dispatched to the ALU0 131, the ALU1 & SHF 132, the LSSEC 134, and the BRNSEC 135.

In addition to INSOPxB, the LSSEC 134 also receives a number of output signals of the ROPSHARED 790. INSLS0B|7:0| and INSLS1B|7:0| are extra ROP information, and are muxed and latched versions of PRExINS|7:0| mapped to the first two undispatched ROPs to the load/store section, as follows: INSLSxB|7:6|, scale factor; INSLSxB|5|, address size (32×16); INSLSxB|4|, lock prefix; and INSLSxB|3:0| 0000 reserved, 0001 CS, 0010 DS, 0011 ES, 0100 FS, 0101 GS, 0110 SS, and others defined by microcode. FASTCN0B|31:0| and FASTCN1B |31:0| are fast displacement paths to the load/store section LSSEC 134, and are muxed and latched versions of DISPxB [31:0| mapped to the first two undispatched ROPs mapped to the load/store section. These busses are "don't care" if there is no corresponding dispatch to the load/store section.

In addition to INSOPxB, the BRNSEC 135 also receives an output signal of the ROPSHARED 790. INSBRN|4:0| is extra ROP information mapped to the first undispatched ROP to the branch section (indicated by signal USEFLGRD |1:0|), as follows: INSBRN|4|, exchange underflow; INSBRN|3:2|, cache column selected from CLMx|1:0|; INSBRN|1|, branch predicted taken selected from PRDTKNx; and INSBRN|0|, microbranch indication (1:ICACHE 104; 0:IDECODE 108).

Microcode Patch Circuits

Figure 9:
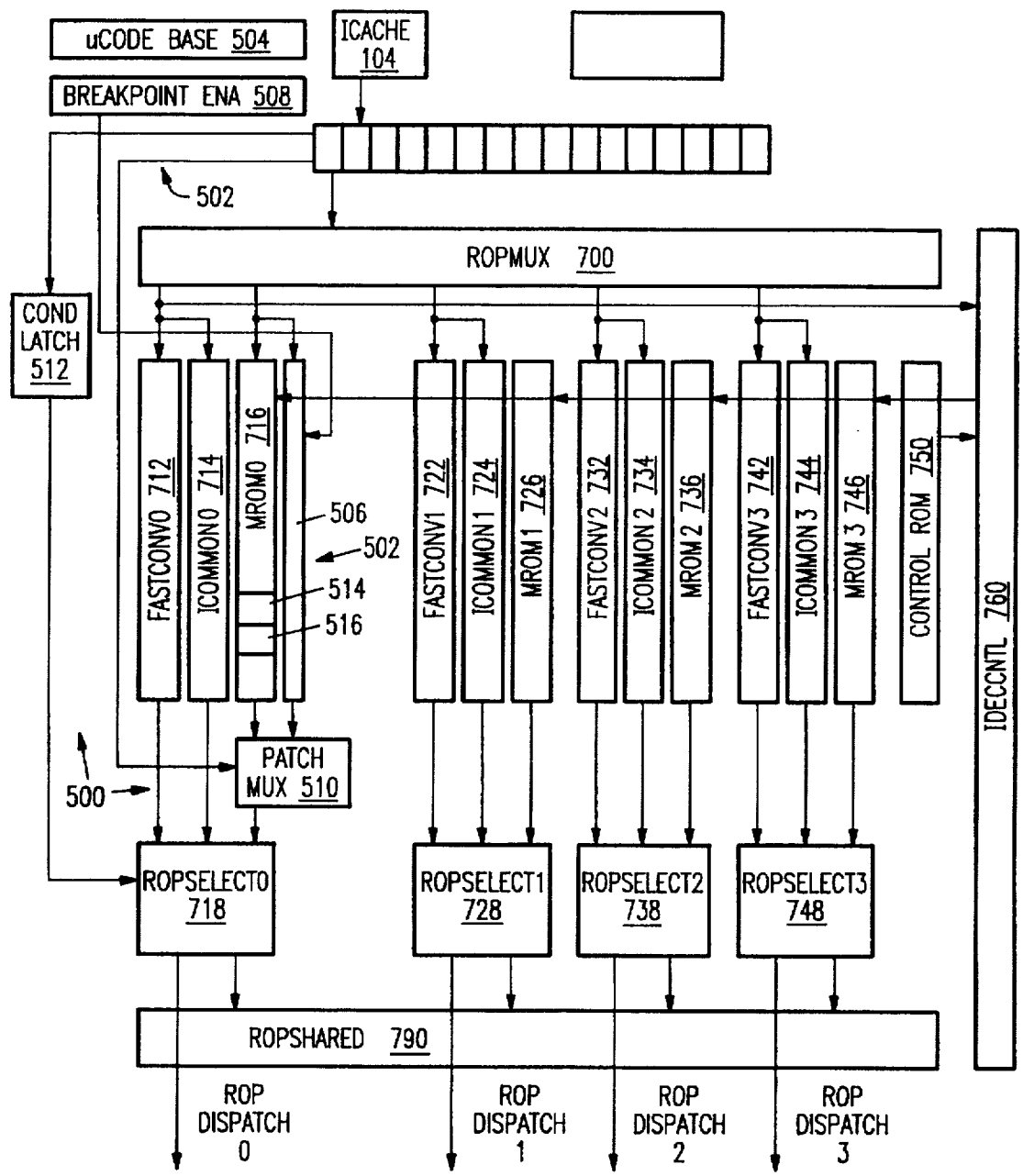
FIG. 9 illustrates a schematic block diagram of a microcode patching apparatus for usage in a processor.

Referring to FIG. 9, a microcode patching apparatus 500 is shown in conjunction with the processor 100. Rather than using on-chip RAM or ROM memory and thus consuming valuable integrated circuit space for a short-term patching functionality, the microcode patching apparatus 500 utilizes external memory (not shown) to supply the patching operation. The microcode patching apparatus 500 exploits the normal instruction fetching logic of the processor 100 using various dedicated microcode ROM breakpoint logic 502 and a microcode base address register 504. The microcode ROM breakpoint logic 502 includes a breakpoint RAM array 506 and a breakpoint enable register 508. The breakpoint RAM array 506 includes a single RAM bit for each 4-ROP MROM block of a microcode ROM such as MROM0 716, MROM1 726, MROM2 736, and MROM3 746. Breakpoint enable register 508 is written with an MROM block address and a value for setting a bit in the breakpoint RAM array 506. When microcode ROM controller IDECCNTL 760 accesses an MROM block having a breakpoint bit set in breakpoint RAM array 506, microcode patching apparatus 500 vectors to a special microcode routine of microcode ROMs MROM0 716, MROM1 726, MROM2 736, and MROM3 746. The special microcode routine switches IDECODE 108 into a patch operational mode and begins fetching an appropriate patch sequence from a 32KB patch area in external memory. The patch area of external memory stores a plurality of 59-bit ROPs, each in a 64-bit quadword RAM memory. The base address of the patch area is specified by an address written to the microcode base address register 504.

The microcode patching apparatus 500 is implemented in the first dispatch position 710 and supports patching of all microcode ROMs MROM0 716, MROM1 726, MROM2 736 and MROM3 746. In other embodiments, the microcode patching apparatus 500 may be implemented in any of the four dispatch positions 710, 720, 730 and 740. Still other embodiments may implement a plurality of microcode patching apparati 500 in multiple dispatch positions. One advantage to implementation of patching on a single dispatch position is to reduce integrated circuit costs and conserve integrated circuit area. An advantage of implementing patching in additional dispatch positions is an increase in execution speed during patching operation.

The microcode patching apparatus 500 includes various elements of circuitry and microcode programming that interact with IDECODE 108 circuits to furnish microcode patching functionality. The circuitry elements include the breakpoint RAM array 506, the microcode base address register 504, a patch multiplexer 510 and conditional latches 512. The microcode programming elements for controlling patch mode include a patch mode control handler 514 and a patch mode exit handler 516.

The breakpoint RAM array 506 is associated with a microcode ROM such as MROM0 716, MROM1 726, MROM2 736, and MROM3 746. In the illustrative embodiment shown in FIG. 9, a single breakpoint RAM array 506 is associated with the first dispatch position 710. Bit values in breakpoint RAM array 506 are individually set by writing an enable code to the breakpoint enable register 508 and individually cleared by writing a disable code to the breakpoint enable register 508. The values in breakpoint RAM array 506 are cleared by a reset of the processor 100. The 11-bit address specified by address lines MROMADDR |10:0| and GOMROM are applied to breakpoint RAM array 506 as they are applied to MROM0 716. Accordingly, the breakpoint bit value of the breakpoint RAM array 506 is available at the same time a 59-bit microcode word is accessed from MROM0 716. When the breakpoint bit is set, microcode patching apparatus 500 does not access the microcode word from ROM0 716 but rather initiates access of a 64-bit microcode word from external memory.

Usage of the breakpoint RAM array 506 advantageously allows patching of any ROP or combination of ROPs in microcode ROM. An entire microcode ROM memory MROMx, less a small amount of memory used for ROM entry and exit routines, can be patched using breakpoint RAM array 506 with no additional expenditure of integrated circuit area.

When the patch operating mode is not in operation, but rather the standard operating mode is controller IDECODE 108 operation, the control ROM 750 controls microbranch sequencing of microcode ROM instruction execution among the microcode ROMs MROM0 716, MROM1 726, MROM2 736, and MROM3 746 in a flexible programmed manner so that execution branching occurs, as desired, from address to address within an MROM or from one MROM to another. Branching while operating in the standard operating mode, rather than in patch mode, is controlled using the sequence control field and microbranch ROPs. However, patch mode operates by executing ROPs that are loaded from an external memory so that what is modified in a flexible manner is the 59-bit ROP code. The sequence control field is not modified in patch mode. Thus in patch mode operation, branching behavior is controlled only by loading microbranch ROPs and the sequence control field is not used. In this manner, branching behavior is restricted to conditional and unconditional microbranch jump ROPs.

The patch multiplexer 510 is a two-to-one multiplexer that is connected to BYTEQ 106 via the ROPMUX 700 scanner and connected to an associated microcode ROM such as MROM0 716, MROM1 726, MROM2 736, and MROM3 746. The patch multiplexer 510 also receives a multiplex control signal from a breakpoint RAM array 506. In some embodiments, the microcode patching apparatus 500 includes separate patch multiplexers 510 for several or all of the microcode ROMs. In other embodiments, such as the illustrative embodiment shown in FIG. 9, a single patch multiplexer 510 is associated with a single microcode ROM, for example MROM0 716. The patch multiplexer 510 is connected to BYTEQ 106 to receive a first microcode ROP and connected to MROM0 716 to receive a second microcode ROP. A bit signal from the breakpoint RAM array 506 determines which microcode ROP is selected. For example, a logic 1 from the breakpoint RAM array 506 selects the external ROP made available by BYTEQ 106. Although the patch multiplexer 510 inserts a short delay in the IDECODE 108 data path, a relatively long delay and additional circuitry, which are inherent in circuits using a comparison operation such as a tag comparison operation, are avoided.

The microcode base address register 504 is set to inform IDECODE 108 hardware of the base address, in external memory, from which to retrieve patch microcode. The microcode base address register 504 specifies the base address of the patch area in external memory so that the area can be located at any position in the 4GB physical address area. The microcode base address is stored in the microcode base address register 504 to define the base address for all ROPs in the microcode rom MROM. When a particular ROP is to be patched, the bit in breakpoint RAM array 506 that corresponds to the ROP is set and the 11-bit MROM address of that ROP block, which is specified by address lines MROMADDR|10:0| and GOMROM, is latched and combined with the stored microcode base address to designate an ROP sequence in external memory to replace the MROM block of ROPs. The starting address for a particular breakpoint is formed by shifting the 11-bit MROM address right by four bits (making the address 16-byte aligned) and concatenated with the 17-bit patch area base address. 16-byte alignment allows two ROPs to be placed at any patch entrypoint. Thus the microcode patching apparatus 500 can access any position in the 32KB patch area. Thus a 32-bit address to external memory is applied to the IAD bus, including the microcode base address in bits 31:15, the break point MROM address in bits 14:4, and four zero bits in bit locations 3:0.

Using this address structure, a microcode line in a microcode ROM has a corresponding 128 bits allocated in external memory. These 128 bits are sufficient to store two patch ROPs, assuming no jumping outside the external microcode. Thus two external memory patch ROPs are furnished for a patched ROP in microcode ROM. When additional patch ROPs are sought, subsequent 128-bit sections of external memory may be utilized so long as corresponding sections of the microcode ROM are not patched. Thus, if the next sequential patch entry point following the two patch ROPs are also used for a patch, the preceding ROPs include a branch to a location in external memory for the rest of the patch. The external memory is managed so that ROPs from different patches do not overlap.

Conditional latches 512 are a set of latches that latch the state of the byte queue BYTEQ 106 prior to entering patch mode. The state of BYTEQ 106 for patch mode purposes includes several bytes of the instruction field of the first instruction in BYTEQ 106 following initiation of patch mode. The conditional latches 512 store the state of BYTEQ 106 so that externally-fetched ROPs operating during patch mode utilize these state variables. The state information held in conditional latches 512 is in the form of a consolidated or summarized prefix, an opcode byte, a mode RM byte, a SIB byte, 32 bits of displacement and 32 bits of immediate data. To store this information, conditional latches 512 function as a 96-bit register.

Patch mode is initiated when an ROP is accessed in microcode ROM and the bit corresponding to the ROP in breakpoint RAM array 506 is set. Patch mode control handler 514 responds to commencement of patch mode operation by setting a patch mode signal that is communicated to various structures in IDECODE 108 and ICACHE 104. With the patch mode signal set, ICACHE 104 functions in an external microcode fetch mode until a specific sequence of events occurs to terminate patch mode operation. In the external microcode fetch mode, every access of external memory by ICACHE 104 is an eight-byte, non-cacheable access. The eight-byte fetch is predecoded to include an opcode, a modRM byte, two bytes of immediate data, and four bytes of displacement. Any encoding that marks the start byte as the opcode and has a total byte length of eight bytes is correctly interpreted by ROPMUX 700 to be a patch mode encoding. In contrast, standard x86 instructions are variable length instructions for which instruction boundaries must be found so that instructions can be decoded. In the external microcode fetch mode, an eight byte microcode ROP, with the first byte marked as the start byte and the last byte marked as the end byte, is applied to BYTEQ 106, causing the patch mode ROP to be interpreted as an eight-byte instruction. The standard operability of BYTEQ 106 and the ROPMUX 700 scanner are exploited to automatically allocate the eight-byte external microcode ROP to the first dispatch position 710 of IDECODE 108. IDECODE 108 treats the patch mode ROP in the manner of any eight-byte instruction in a standard operating mode.

The eight-byte external microcode ROP is scanned by the ROPMUX 700 scanner and applied to the patch multiplexer 510 along with the output ROP from microcode rom MROM0 716 and the control signal from breakpoint RAM array 506. The control signal is set so that the external microcode ROP is passed by the patch multiplexer 510. BYTEQ 106 and ROPMUX 700 respond to the start byte and end byte alone and therefore operate in the same manner in either patch mode or standard mode. The eight-byte external microcode ROP is processed by the ROPMUX scanner 700 in the same manner as a typical eight-byte x86 instruction and is serialized to be applied to the front of BYTEQ 106 and therefore inherently is distributed to the first dispatch position 710. The control signal from breakpoint RAM array 506 is a logic 1 so that the external memory ROP received via the ROPMUX scanner 700 is selected and the low order 59 bits of the external memory ROP is passed to other IDECODE 108 circuits by patch multiplexer 510.

Subsequent external ROPs are passed through IDECODE 108 using the same procedure with additional eight-byte microcode ROM ROPs applied to the front of BYTEQ 106 and distributed to the first dispatch position 710 in the manner that normal x86 instructions are applied and distributed. Meanwhile, the 59-bit external microcode ROPs are selected by the patch multiplexer 510 in a manner which is unique to patch mode operation. In patch mode operation, IDECODE 108 makes no attempt to decode the external microcode ROM ROP as an x86 instruction but instead simply passes the low order 59 bits of the eight bytes taken from external memory.

Patch mode operation diverges from normal operation with respect to branch prediction functionality. In particular, patch mode ROPs are typically restricted to straight line code in which ROPs are executed in the order of fetching from external memory. Branching is achieved using a jump ROP that is predicted not taken. When the jump ROP mispredicts, all subsequent ROPs are cancelled and the processor 100 circuits for handling misprediction, which is essentially unchanged in structure or function to accommodate patch mode, jumps to an external memory ROP in the correct branch. This ROP is interpreted as an eight-byte instruction consistent with patch mode operation.

Branch prediction functionality also differs in patch mode with respect to microbranch operation. In standard mode, various microcode subroutine calls and microbranches are performed by the MROM sequence control logic without executing an ROP. These functions are prohibited in patch mode. Instead ROPs are used to achieve these functions.

Patch mode control handler 514 initiates patch mode operation and sets the patch mode signal. The patch mode signal sets ICACHE 104 to operate in a mode in which all memory accesses are noncacheable, thereby simplifying operation of ICACHE 104. In other embodiments of the microcode patching apparatus 500, memory accesses are cached, although handling of logical (i.e., virtual), linear and physical addressing complicates patch mode operation. In the illustrative embodiment, patch mode exploits an existing capability of ICACHE 104 to be set in a noncacheable operating mode.

When bit 63 of an external memory ROP is set, the patch mode exit handler 516 terminates patch mode in response to a specific signal.

Microcode Patch Procedure

Figure 10:
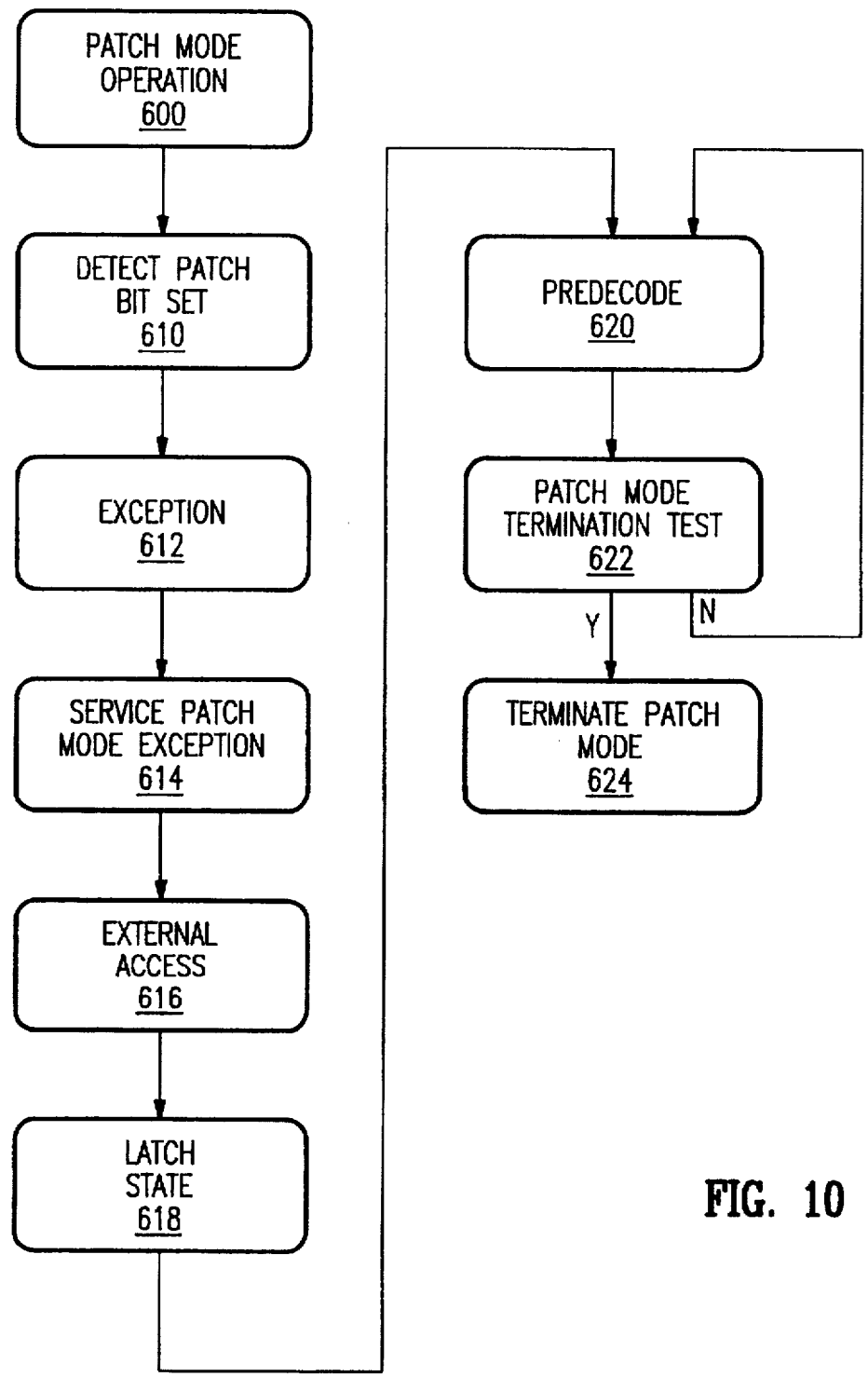
FIG. 10 is a flow chart which illustrates a patch mode operating method.

Referring to FIG. 10, patch mode operation 600 is initiated in a detect patch bit set step 610 when an ROP is accessed in microcode ROM and the bit corresponding to the ROP in breakpoint RAM array 506 is set.

In response to a set patch bit, conditional latches 512 then latch the state of the byte queue BYTEQ 106 in latch state step 611 including an extended instruction point (EIP) of the next instruction (which is accessed using a "constpc" ROP), a consolidated instruction prefix, instruction opcode, instruction modRM, instruction S-I-B, and instruction displacement and immediate data of the current instruction. The EIP register (not shown) holds a program counter or retire PC which represents the rolling demarcation point in the program under execution which divides executed instructions which are nonspeculative from instructions which have been executed upon speculation. The EIP or retire PC is continually updated upon retirement of result operands from reorder buffer (ROB 114) to register file (REGF 112) to reflect that such retired instructions are no longer speculative.

Also in response to a set patch bit, an internal IDECODE exception is triggered in exception step 612. IDECODE 108 dispatch is redirected to a "patch mode" microcode routine in service patch mode exception step 614, which sets the patch mode signal and initiates external fetching of patch code. The patch mode signal activates patch mode operation in the ICACHE 104. The patch mode microcode directs an external access step 616 which is a noncacheable, nontranslated, direct-mapped external access which is issued at a 32-bit address specified by the microcode base address in bits 31:15, the breakpoint MROM address in bits 14:4 and zeros in bits 3:0. The patch mode microcode initiates the external access by executing a jump ROP which causes a cache miss. Patch mode functionality relies on the standard operation of ICACHE 104 which responds to a cache miss by performing an external access.

An ROP from external memory is then predecoded as fastpath, single ROP instruction in predecode step 620. The instruction boundary of the ROP data is known so that the start byte is at the beginning of the sixteen bytes of the BYTEQ 106. The end byte is known to follow seven bytes after the start byte. This pattern continues so that each succeeding instruction is known to be an eight-byte instruction. PREDECODE 212 is thus fixed into an operating mode which continually passes eight-byte instructions, each eight-byte instruction being independent of the other eight-byte instructions. Thus the analysis that is performed by the PREDECODE 212 when the processor is operating in a normal and standard mode, rather than the patch mode, is avoided. The 59-bit ROP codes read from external memory do not necessarily contain all of the information necessary to execute an ROP. Some of the execution information is stored in the conditional latches 512. The information held in the conditional latches 512 is accessed, when needed, from the latches 512.

In contrast to the patch mode operation, in a standard and normal operating mode, PREDECODE 212 analyzes the opcode by applying the opcode to an x86 opcode map. Then, depending on the opcode, PREDECODE 212 analyzes the modRM byte, SIB byte and displacement, for example using lookup tables in ICACHE 104, and determines the end byte location using this analysis.

The eight byte data containing the external memory ROP is then applied to BYTEQ 106 and the normal scanning mechanism of IDECODE 108 allocates the ROP to the first dispatch position. The set patch bit then operates to force IDECODE 108 into an operating mode in which the raw ROP data read directly from external memory is multiplexed with an ROP in the microcode ROM and selected to replace the ROP from microcode ROM. However, only the low order 59 bits of the 64-bit external memory ROP are passed by the patch multiplexer 510. Thus the ROP from external memory is executed just as the microcode ROM would execute in a standard operating mode.

In this patch mode embodiment various restrictions apply which constrain patch mode operation as compared to normal operation. One restriction is that floating point ROPs are not operable in patch mode. This restriction is imposed because only a single dispatch position implements patch mode in this illustrative embodiment and floating point operations are issued in ROP pairs. In other embodiments, additional patch mode circuits including a patch multiplexer are implemented in additional dispatch positions so that a pair of floating point ROPs are issued in a patch mode.

Another restriction is that the sequence control field is not used in patch mode so that all branches in patch mode are implemented as ROPs and dispatched to BRNSEC 135. This restriction is imposed to avoid complexity. Microcode patch base address is automatically supplied from microcode base address register 504 on the DPC bus. The following examples illustrate assembly instructions of microcode for executing jump operations:

| | | | | |
|---|---|---|---|---|
| (1) | | consta | tmp0, | label |
| | | jmpi | | tmp0 |
| | | .. | .. | .. |
| | label: | .. | .. | |
| and | | | | |
| (2) | | andi | tmp1, | tmp1, 8 |
| | | consta | tmp0, | label |
| | | jmrzi | tmp1, | tmp0 |
| | | .. | | .. |
| | label: | .. | | .. |
| for example. | | | | |

Predecode step 620 proceeds in parallel with a test for patch mode termination test step 622 which tests for termination of patch mode. Bit 63 of the external memory ROP is used to terminate patch mode operation. When bit 63 of an external memory ROP is set, IDECODE 108 operates as though one x86 instruction is complete and another x86 instruction is to be fetched. If bit 63 is not set, IDECODE 108 continues to access external memory in external access step 616. If bit 63 is set, terminate patch mode step 624 is performed.

Terminate patch mode step 624 is performed by a microcode ROM routine which executes two levels of jump or branch operations, which redirect control from the external memory patch mode ROPs to the patch mode exit handler 516 microcode ROM routine. The patch mode terminate microcode determines an appropriate program counter for fetching x86 instructions. The following example depicts a suitable patch mode exit handler 516 microcode routine which implements termination of patch mode:

| | | |
|---|---|---|
| constpc | tmp11 | ;store return PC in tmp11 |
| const tmp0, | EXIT_HNDLR | ;decode pad jump entrypoint |
| resume | tmp0 | ;resume |
| ... | | |
| ... | | |
| EXIT_HNDLR: | | |
| jmp | tmp11 | |

The "constpc" instruction accesses the x86 address of the return program counter (PC) and temporarily stores the return PC in tmp11. The "const" instruction accesses the address of the patch mode exit handler 516 (EXIT HNDLR) an temporarily stores the address in tmp0. The "resume" is a jmpi operation with bit 63 set.

The patch mode exit handler 516 includes a "jmp tmp11" operation that causes an x86 level misprediction. This misprediction starts ICACHE 104 in a normal operating mode. The patch mode exit handler 516 also clears the patch mode signal.

Another technique for implementing a microcode patching function is to implement a RAM memory, such as a content addressable RAM (CAM) to furnish instructions selectively replacing instructions from a microcode ROM. The CAM is typically a much smaller memory than the ROM, particularly considering that RAM requires a much larger area than ROM for supplying a particular memory capacity. To replace a microcode ROM entry at a given address, the CAM stores both the address of the ROM entry and the replacement instruction for the ROM-programmed instruction entry. When a patched ROM entry is accessed, the address of the patched ROM entry is compared with the addresses in the CAM. When the address of the patched ROM entry matches a CAM address, the CAM instruction entry corresponding to the CAM address is executed, replacing the microcode ROM entry. An advantage of the RAM patch technique is that one or a few lines of microcode are quickly replaced. A disadvantage of the RAM patch technique is that the number of patches is substantially limited by the RAM size. In contrast, the disclosed microcode patching technique includes a single bit RAM which corresponds to each microcode ROM entry so that essentially all microcode ROM can be patched, except for a few microcode lines that implement the microcode patch function. Another disadvantage of the RAM patch technique in comparison with the disclosed technique is that the RAM patch technique requires a comparison between the address of each microcode ROM entry and addresses in the RAM memory and usage of a multiplexer to select the appropriate instruction source. The imposition of many comparisons is very time consuming and greatly slows the operating speed of the RAM patch technique. In contrast the disclosed patch method utilizes a multiplexer alone to select between the microcode ROM instruction and the external data. The disclosed technique is much faster than the comparison utilized in the RAM patch method.

While the invention has been described with reference to various embodiments, it will be understood that these embodiments are illustrative and that the scope of the invention is not limited to them. Many variations, modifications, additions and improvements of the embodiments described are possible. For example, although patch mode operation is illustrated as applied to nonfloating point operations, this restriction is imposed only in interest of simplifying the detailed description. Extension of patch mode operation to a floating point capability follows directly from the description hereinabove and the scope of the invention is expressly extended to include a floating point patch mode capability. Furthermore, although the illustrative embodiment depicts a system in which external accesses are noncacheable, in other embodiments within the scope of the invention, patch ROPs are cacheable to furnish a faster system speed at the cost of additional complexity in controlling the instruction cache.

What is claimed is:

1. An apparatus for supplying decoded operational information comprising:
   an external memory storing codes including instructions and decoded operational information;
   a permanent memory including a plurality of operational information elements;
   a decoder coupled to the external memory and coupled to the permanent memory, the decoder including a circuit converting an instruction to an entrypoint directing the location of access into the permanent memory;
   a programmable memory coupled to the decoder including a plurality of selection elements corresponding to the plurality of operational information elements; and
   a patch circuit coupled to the external memory, permanent memory and programmable memory, the patch circuit including a patch base address register a breakpoint select switch, and a patch multiplexer, the patch circuit supplying operational information designated by the entrypoint from the permanent memory when the breakpoint select switch is set to a first switch value and supplying decoded operational information from the external memory at an address designated by the patch base address register when the breakpoint select switch is set to a second switch value, the selection being controlled by the breakpoint select switch via operation of the patch multiplexer.

2. An apparatus according to claim 1, wherein:
   the patch base address register is a programmable register designating an address in external memory for accessing decoded operational information.

3. An apparatus according to claim 2 wherein the address programmed in the patch base address register is concatenated with the entrypoint to designate the address in external memory for accessing decoded operational information.

4. An apparatus according to claim 1 wherein:
   the patch circuit further includes:
   a breakpoint enable register coupled to the programmable memory wherein:
       the programmable memory is a breakpoint random access memory (RAM) array including a single RAM bit for an operational information element in the permanent memory;
       the breakpoint enable register is loaded into the breakpoint RAM array; and
       the single RAM bit is programmed to a 0 or 1 to control whether operational information designated by the entrypoint from the permanent memory or decoded operational information from the external memory is selected.

5. An apparatus according to claim 1, further comprising conditional latches for latching parameters indicative of a state of the instructions prior to commencing selection of decoded operational information from the external memory.

6. An apparatus according to claim 1, further comprising:
   a patch mode control handler for controlling fetching of decoded operational information from external memory.

7. An apparatus according to claim 6, wherein the patch mode control handler fetches decoded operational information from external memory in an eight-byte noncacheable access.

8. An apparatus according to claim 1 wherein the permanent memory is a microcoded read only memory (ROM).

9. An apparatus according to claim 1 wherein the apparatus decodes complex instruction set computer (CISC) instructions into RISC-like operations (ROPs) operable on a reduced instruction set computer (RISC) superscalar core, the instructions are CISC instructions and the decoded operational information is ROP information.

10. An apparatus for supplying decoded operational information comprising:
   an external memory storing instructions and decoded operational information;
   a circuit coupled to the external memory for decoding instructions into decoded operational information, the circuit further including:
      an interface circuit coupled to the external memory supplying instructions and decoded operational information;
      a conversion circuit coupled to the interface circuit converting instructions into an entrypoint;
      a permanent memory coupled to the conversion circuit and the interface circuit storing a plurality of operational information elements corresponding to instructions in accordance with the entrypoint;
      a plurality of programmable selection control elements corresponding to operational information elements of the permanent memory;
      a patch circuit coupled to the external memory, permanent memory and the plurality of programmable selection control elements the patch circuit including a patch base address register and a breakpoint select switch; and
      a demultiplexer coupled to the patch circuit to receive control signals coupled to the interface circuit to receive decoded operational information from the external memory, coupled to the permanent memory to receive operational information elements in accordance with the entrypoint, and coupled to the programmable selection control elements, the patch circuit selecting operational information designated by the entrypoint from the permanent memory when the breakpoint select switch is set to a first switch value and selecting decoded operational information from the external memory at an address designated by the patch base address register when the breakpoint select switch is set to a second switch value, the selection being controlled by the breakpoint select switch via operation of the demultiplexer.

11. An apparatus according to claim 10, wherein:
   the patch base address register is a programmable register designating an address in external memory for accessing decoded operational information.

12. An apparatus according to claim 11 wherein the address programmed in the base address register is concatenated with the entrypoint to designate the address in external memory for accessing decoded operational information.

13. An apparatus according to claim 10 wherein:
   the patch circuit further includes:
      a breakpoint enable register coupled to the plurality of programmable selection control elements wherein:
         the programmable selection control elements are a breakpoint random access memory (RAM) array including a single RAM bit for an operational information element in the permanent memory;
         the breakpoint enable register is loaded into the breakpoint RAM array; and
         the single RAM bit is programmed to a 0 or 1 to control whether operational information designated by the entrypoint from the permanent memory or decoded operational information from the external memory is selected.

14. An apparatus according to claim 10, further comprising conditional latches for latching parameters indicative of a state of the instructions prior to commencing selection of decoded operational information from the external memory.

15. An apparatus according to claim 10, further comprising:
   a patch mode control handler for controlling fetching of decoded operational information from external memory.

16. An apparatus according to claim 15, wherein the patch mode control handler fetches decoded operational information from external memory in an eight-byte noncacheable access.

17. An apparatus according to claim 10 wherein the apparatus decodes complex instruction set computer (CISC) instructions into RISC-like operations (ROPs) operable on a reduced instruction set computer (RISC) superscalar core, the instructions are CISC instructions and the decoded operational information is ROP information.

18. An apparatus according to claim 10 wherein the permanent memory is a microcoded read only memory (ROM).

19. An apparatus for decoding complex instruction set computer (CISC) instructions into RISC-like operations (ROPs) operable on a reduced instruction set computer (RISC) superscalar core, comprising:
   a plurality of dispatch positions for converting a sequence of at least one CISC instructions read from an external memory into a plurality of ROPs, the CISC instructions mapping to a sequence of one or more ROPs;
   an ROP multiplexer for allocating the dispatch positions to the CISC instruction sequence in program order and for directing the CISC instructions of the CISC instruction sequence to at least one of the dispatch positions;
   an instruction conversion circuit in the dispatch positions for converting a first-type CISC instruction to ROP information;
   a permanent memory in the dispatch positions for converting a second-type CISC instruction to ROP information;
   a programmable memory corresponding to the second-type CISC instruction;
   a demultiplexer coupled to the ROP multiplexer to receive ROP information from the external memory, coupled to the permanent memory to receive ROP information converted from a second-type CISC instruction and coupled to the programmable memory, the demultiplexer selecting ROP information from the external memory or the permanent memory in accordance with the programmable memory; and
   an ROP selector for selecting ROP information from the instruction conversion circuit for ROPs mapped from first-type CISC instructions and from the permanent memory for ROPs mapped from second-type CISC instructions, and for dispatching ROPs in a current dispatch window to the superscalar RISC core.

20. An apparatus according to claim 19, wherein the programmable memory and demultiplexer are coupled to a single dispatch position.

21. An apparatus according to claim 19, further comprising:
a plurality of programmable memories and demultiplexers so that the dispatch positions include a programmable memory and a demultiplexer.

22. An apparatus according to claim 19, further comprising:
a programmable base address register designating an address in external memory for accessing ROP information.

23. An apparatus according to claim 19 further comprising:
a breakpoint enable register coupled to the programmable memory wherein:
the programmable memory is a breakpoint random access memory (RAM) array including a single RAM bit for each ROP in the permanent memory;
the breakpoint enable register is loaded into the breakpoint RAM array; and
the single RAM bit is programmed to a 0 or 1 to control whether ROP information converted from a second-type CISC instruction or ROP information from the external memory is selected.

24. An apparatus according to claim 19, further comprising conditional latches for latching parameters indicative of a state of the instructions prior to commencing selection of ROP information from the external memory.

25. A method of supplying decoded operational information comprising the steps of:
accessing codes from an external memory, the codes including instructions and decoded operational information;
converting an instruction to an entrypoint;
applying the entrypoint to a permanent memory including a plurality of operational information elements to select an element;
testing a preset patch select signal to determine whether a patch mode is selected;
if the patch mode is selected:
reading a patch mode address designation from a patch base address register, the patch base address designating a base address in the external memory; and
combining the patch base address and the entrypoint to designate an access address in the external memory; and
supplying operational information designated by the entrypoint from the permanent memory if the patch mode is not selected and supplying decoded operational information from the external memory if the patch mode is selected.

26. A method according to claim 25, further comprising the steps of:
designating an address in external memory for accessing decoded operational information by programming the patch base address register; and
concatenating the programmed address of the patch base address register with the entrypoint to designate the address in external memory for accessing decoded operational information.

27. A method according to claim 25 further comprising the step of:
enabling patch mode selection by programming a programmable breakpoint enable register.

28. A method according to claim 25, further comprising the step of:
latching parameters indicative of a state of the instructions prior to commencing selection of decoded operational information from the external memory.

29. A method according to claim 25 wherein:
complex instruction set computer (CISC) instructions are converted into RISC-like operations (ROPs) operable on a reduced instruction set computer (RISC) superscalar core;
the instructions are CISC instructions; and
the decoded operational information is ROP information.

30. A method according to claim 25, further comprising the step of:
controlling fetching of decoded operational information from external memory.

31. A method according to claim 30, wherein the controlling step comprises the step of:
fetching decoded operational information from external memory in an eight-byte noncacheable access.

* * * * *